(12) United States Patent
Ksondzyk et al.

(10) Patent No.: US 8,577,644 B1
(45) Date of Patent: Nov. 5, 2013

(54) HARD PRESS REJECTION

(71) Applicant: Cypress Semiconductor Corporation, San Jose, CA (US)

(72) Inventors: Petro Ksondzyk, Mill Creek, WA (US); Jae-Bum Ahn, Hwasung (KR)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 13/930,303

(22) Filed: Jun. 28, 2013

Related U.S. Application Data

(60) Provisional application No. 61/775,962, filed on Mar. 11, 2013.

(51) Int. Cl.
*G01B 5/26* (2006.01)
*G01N 37/00* (2006.01)

(52) U.S. Cl.
USPC .............. 702/156; 345/173; 345/174; 702/82

(58) Field of Classification Search
USPC ............ 702/81–85, 94, 95, 98, 104; 345/173, 345/174
See application file for complete search history.

(56) References Cited

U.S. PATENT DOCUMENTS

| 8,284,170 | B2 * | 10/2012 | Bernstein | 345/174 |
| 2009/0174679 | A1 * | 7/2009 | Westerman | 345/173 |

* cited by examiner

*Primary Examiner* — John H Le

(57) ABSTRACT

Techniques for hard press rejection are described herein. In an example embodiment, a touch area on a sensor array is determined, where the touch area corresponds to a detected object and is associated with multiple signal values. A slope value for the detected object is computed based on a ratio of a signal distribution value in the touch area to a metric indicating a size of the touch area with respect to the sensor array. The slope value is compared to a threshold in order to determine whether to accept or to reject the detected object, and the detected object is rejected based on the comparison.

20 Claims, 14 Drawing Sheets

| | 0 | 1 | 2 | 3 | 4 | 5 | ... |
|---|---|---|---|---|---|---|---|
| 0 | 0 | 0 | 0 | -1 | 0 | 0 | |
| 1 | 0 | 1 | 0 | 0 | 0 | 0 | |
| 2 | 0 | 5 | 14 | 2 | 0 | 0 | |
| 3 | 1 | 30 | 48 | 35 | 2 | -2 | |
| 4 | 1 | 32 | 44 | 46 | 4 | -1 | |
| 5 | 2 | 8 | 27 | 16 | 1 | 0 | |
| 6 | 1 | 1 | 1 | 1 | 0 | 1 | |

302 index (TX)
304 index (RX)
306 sensor value
308 contact by an object
300

FIG. 3

| 3 | 4 | 3 | 4 | 5 | 3 | 4 | 3 | 3 | 5 |
|---|---|---|---|---|---|---|---|---|---|
| 3 | 3 | 4 | 3 | 6 | 3 | 4 | 3 | 4 | 4 |
| 3 | 3 | 5 | 6 | 9 | 10 | 7 | 5 | 3 | 3 |
| 2 | 3 | 6 | 13 | 16 | 16 | 14 | 9 | 4 | 4 |
| 4 | 7 | 13 | 15 | 16 | 15 | 16 | 13 | 5 | 5 |
| 4 | 10 | 14 | 15 | 14 | 15 | 15 | 12 | 5 | 4 |
| 5 | 10 | 14 | 14 | 15 | 14 | 12 | 7 | 5 | 4 |
| 4 | 7 | 9 | 10 | 9 | 8 | 6 | 4 | 4 | 4 |
| 4 | 4 | 5 | 5 | 7 | 4 | 5 | 4 | 5 | 4 |
| 2 | 3 | 4 | 4 | 3 | 4 | 4 | 3 | 3 | 4 |

504B touch through 2mm leather cover with fat finger (e.g., a thumb)

| 0 | 0 | 1 | 1 | 0 | 0 | 0 | 1 | 0 | 0 |
|---|---|---|---|---|---|---|---|---|---|
| 2 | 3 | 2 | 2 | 3 | 3 | 4 | 3 | 3 | 1 |
| 2 | 2 | 2 | 6 | 8 | 9 | 6 | 4 | 3 | 2 |
| 2 | 1 | 3 | 8 | 13 | 15 | 9 | 5 | 3 | 2 |
| 2 | 2 | 3 | 8 | 15 | 15 | 12 | 5 | 3 | 2 |
| 1 | 1 | 3 | 5 | 9 | 12 | 7 | 4 | 3 | 2 |
| 2 | 2 | 2 | 2 | 3 | 4 | 4 | 3 | 2 | 1 |
| 0 | 0 | 0 | 0 | 0 | 1 | 1 | 1 | 0 | 0 |
| 0 | 0 | 0 | 0 | 0 | 0 | 0 | 1 | 1 | 0 |

504A touch through 2mm leather cover with normal finger

FIG. 6A — 600, 602 contact by a 4mm real finger

| 1 | 2 | 2 | 2 | 2 | 2 | 0 |
|---|---|---|---|---|---|---|
| 0 | 1 | 2 | 2 | 2 | 3 | 0 |
| 0 | 2 | 1 | 15 | 26 | 3 | -1 |
| 0 | 2 | 2 | 19 | 34 | 3 | 0 |
| 0 | 3 | 2 | 3 | 3 | 1 | 0 |
| 0 | 2 | 3 | 3 | 3 | 2 | 0 |

FIG. 6B — 600, 604 contact by a 5mm real finger

| 2 | 2 | 2 | 2 | 2 | 2 |
|---|---|---|---|---|---|
| 3 | 4 | 4 | 3 | 1 | 1 |
| 1 | 4 | 31 | 30 | 2 | 1 |
| 2 | 2 | 32 | 29 | 2 | 1 |
| 0 | 0 | 0 | 0 | 1 | 0 |
| 0 | 1 | 0 | 0 | 0 | 1 |

FIG. 6C — 600, 606 contact by a normal real finger

| 0 | 0 | 0 | 1 | 1 | 2 | 1 |
|---|---|---|---|---|---|---|
| 0 | 1 | 5 | 30 | 32 | 8 | 1 |
| 0 | 0 | 14 | 48 | 44 | 27 | 1 |
| -1 | 0 | 2 | 35 | 46 | 16 | 1 |
| 0 | 0 | 0 | 2 | 4 | 1 | 0 |
| 0 | 0 | 0 | -2 | -1 | 0 | 1 |

|  |  |  |  |  |  |  |  |  |  |  |  |  |
|---|---|---|---|---|---|---|---|---|---|---|---|---|
| -1 | -2 | -5 | -7 | -7 | -6 | -6 | -2 | 3 | 6 | 9 | 7 | 4 | 4 |
| 0 | -8 | -19 | -24 | -26 | -25 | -12 | 13 | 25 | 31 | 38 | 31 | 10 | 6 |
| -1 | -15 | -32 | -40 | -43 | -27 | 17 | 29 | 31 | 35 | 38 | 40 | 23 | 6 |
| -2 | -18 | -37 | -44 | -30 | 12 | 20 | 20 | 24 | 27 | 31 | 35 | 24 | 5 |
| -2 | -18 | -39 | -33 | 7 | 16 | 13 | 12 | 17 | 21 | 24 | 31 | 22 | 1 |
| -2 | -18 | -30 | 4 | 18 | 12 | 7 | 5 | 10 | 14 | 19 | 25 | 11 | -2 |
| -2 | -12 | 6 | 21 | 12 | 5 | 0 | -1 | 3 | 9 | 12 | 20 | 8 | -4 |
| 0 | 9 | 30 | 21 | 13 | 6 | 0 | -1 | 2 | 7 | 12 | 1 | -18 | -5 |
| 1 | 30 | 39 | 29 | 20 | 13 | 8 | 6 | 9 | 8 | -16 | -47 | -26 | -5 |
| 3 | 38 | 47 | 38 | 30 | 24 | 21 | 18 | 4 | -32 | -50 | -49 | -23 | -4 |
| 2 | 21 | 52 | 48 | 42 | 38 | 22 | -4 | -33 | -41 | -41 | -37 | -16 | -2 |
| 2 | 5 | 22 | 37 | 25 | 8 | 6 | -11 | -13 | -14 | -13 | -13 | -5 | 1 |
| 2 | 3 | 5 | 5 | 3 | 1 | 0 | -1 | -1 | -1 | -1 | -1 | 0 | 2 |

610 contact by a fist

USPTO US 8,577,644 B1

HARD PRESS REJECTION

PRIORITY

This application claims the priority and benefit of U.S. Provisional Application No. 61/775,962, filed on Mar. 11, 2013, the entire contents of which are incorporated by reference herein.

TECHNICAL FIELD

This disclosure generally relates to processing of touch sensor data.

BACKGROUND

Computing devices, such as tablets and notebook computers, smartphones and other mobile devices, portable entertainment devices (e.g., handheld video games, multimedia players, etc.), and set-top-boxes (e.g., digital cable boxes, digital video disc (DVD) players, etc.) may include user interface devices that facilitate interaction between a user and the computing device. One type of user interface device that has become common is a touch-input device (e.g., such as a touch-sensor device) that operates by way of capacitance sensing. A touch-input device may be in the form of a touchscreen, touch-sensor pad, touch-sensor slider, or touch-sensor buttons, and may include a sensor comprising and/or coupled to an array of capacitive sensor elements. Capacitive sensing typically involves scan operations that periodically measure changes in capacitance associated with the sensor elements to determine a presence, position, and/or movement of an object (e.g., a stylus, a user's finger, etc.) relative to a touch-input device.

For proper operation, a touch-input device needs to be able to correctly detect and reject contacts caused by non-conductive objects and/or contacts caused through a leather or plastic cover by any object (conductive and non-conductive alike). However, conventional detection and rejection mechanisms typically involve computationally-intensive processing that often limits the functionality of the touch-input device and/or leads to poor user experience.

BRIEF DESCRIPTION OF THE DRAWINGS

FIG. 3 illustrates a signal heatmap example of a contact by an object according to an example embodiment.

FIG. 5B is a block diagram illustrating an example contact by a normal finger through a 2 mm leather cover according to an example embodiment.

FIG. 5C is a block diagram illustrating another example contact by a fat finger through a 2 mm leather cover according to an example embodiment.

FIG. 6A is a block diagram illustrating an example contact by a 4 mm finger according to an example embodiment.

FIG. 6B is a block diagram illustrating an example contact by a 5 mm finger according to an example embodiment.

FIG. 6C is a block diagram illustrating an example contact by a normal finger according to an example embodiment.

FIG. 6E is a block diagram illustrating an example contact by a human fist according to an example embodiment.

DETAILED DESCRIPTION

Figure 1:
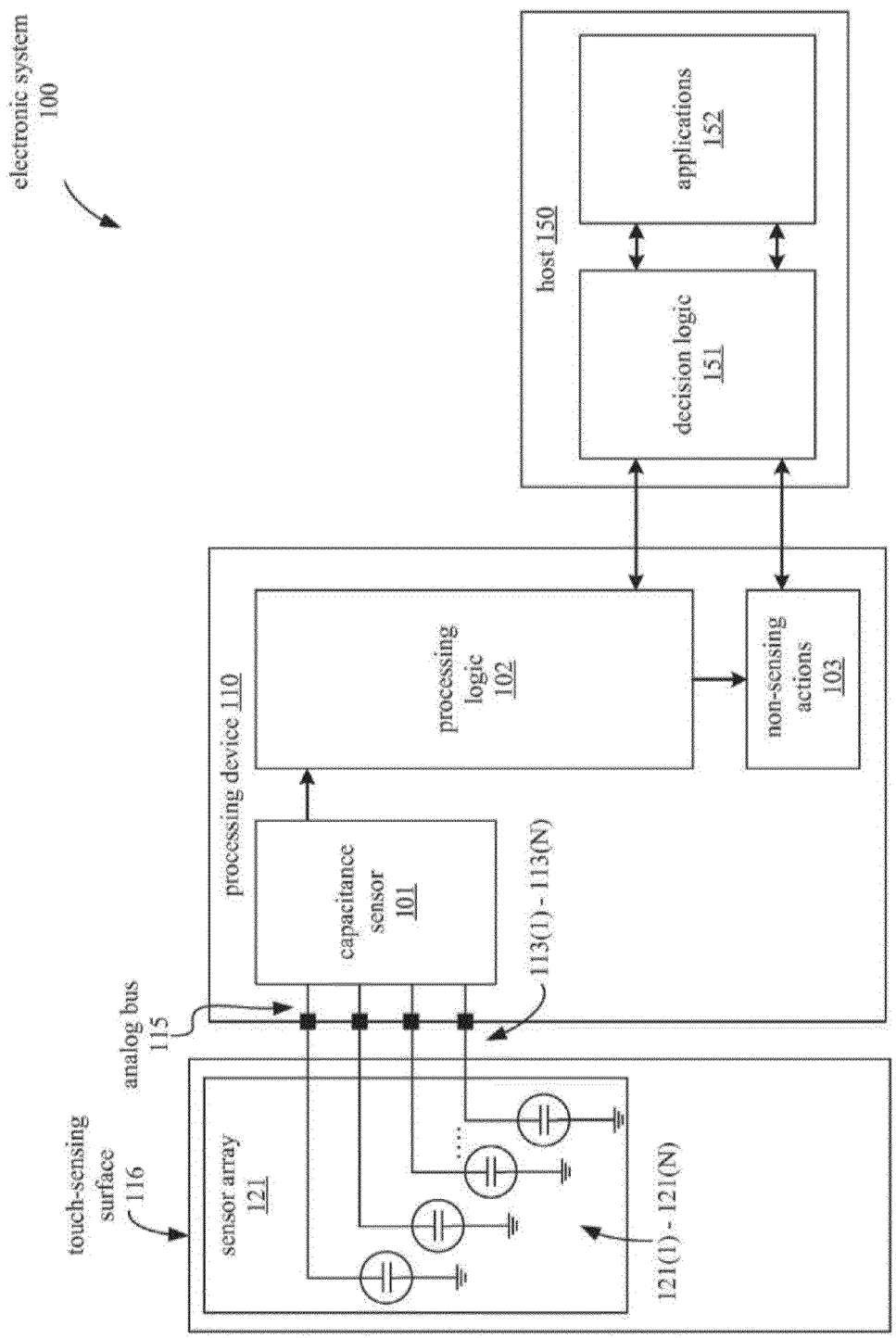
FIG. 1 is a block diagram illustrating an embodiment of an example electronic system that includes touch sensor components.

The following description sets forth numerous specific details such as examples of specific systems, components, methods, and so forth, in order to provide a good understanding of various embodiments of the techniques described herein for hard press rejection. It will be apparent to one skilled in the art, however, that at least some embodiments may be practiced without these specific details. In other instances, well-known components or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

References in this description to "an embodiment", "one embodiment", "an example embodiment", "some embodiments", and "various embodiments" mean that the particular feature, structure, or characteristic being referred to is included in at least one embodiment of the invention. Further, the appearances of the phrases "an embodiment", "one embodiment", "an example embodiment", "some embodiments", and "various embodiments" in various places in the description do not necessarily all refer to the same embodiment(s).

Overview

As used herein, "contact" refers to any action that generates a signal profile and has a measurable touch area on a sensor array. For example, in various embodiments a contact may refer to any one of: a physical touch by an object (e.g., a conductive object such as a stylus, a user's finger, and the like; or a non-conductive object) on the touch-sensing surface of a sensor array; and a hover in which the object is sufficiently proximate to affect at least some sensor elements without being in physical touch with the touch-sensing surface of the sensor array.

"Hard press" refers to a contact on the touch-sensing surface of a sensor array by a non-conductive object or by any type of object through a non-conductive cover, where the contact causes a change in the self and/or mutual capacitance(s) of, and/or between, sensor elements of the sensor array. For example, a hard press may be an actual physical touch applied by a non-conductive object to the touch-sensing surface of a sensor array, thereby causing a surface flexing deformation that reduces the air gap between the touch-sensing surface and the underlying display panel and thus causing a change in sensor element capacitance(s). In another example, a hard press may be a physical touch from a conductive object (e.g., such as a finger or stylus) or non-conductive object though leather, plastic, or other non-conductive cover (e.g., such as a leather glove or a plastic smartphone/tablet cover); in this example, the object touching the cover would press the cover to the touch-sensing surface of the sensor array, thereby also causing a change in the capacitance(s) of at least some sensor elements even though the sensor elements themselves are not physically touched by the object. In another example, a hard press may be caused by a non-conductive object that hovers over the touch-sensing surface of the sensor array, thereby affecting the air gap between the touch-sensing surface and the object. Since such air gap effectively serves the same function as a non-conductive cover, it would affect the sensor elements of the sensor array in a similar way as a non-conductive cover would.

One of the main issues caused by a hard press is a false contact that is not intended or knowingly made by a user, but that is nevertheless processed and acted upon by a touch-input device. To address such issues, described herein are techniques for hard press rejection in touch-input applications. In some example embodiments, the techniques described herein are embodied as filter logic that analyzes the shape of the signal detected on a sensor array and rejects the signal if the analysis indicates a hard press event. For example, the filter logic analyzes the touch area on the sensor array when a contact is first detected and, if the characteristics (e.g., as based on shape) of the contact are flat when compared to a normal contact, the object is rejected and is not reported for further processing. The filter logic thus leverages the idea of evaluating the distribution of the signal values in the touch area with respect to the touch area's size in order to determine a kind of slope for the signal. The premise behind this idea is that a hard press (e.g., by a non-conductive object or a touch through a leather/plastic cover) typically produces a signal that is flatter than the signal produced by a normal contact since the distance to sensing electrodes in the sensor array elements increases.

In an example embodiment, the techniques for hard press rejection described herein may be implemented as a method performed by a computing device. In this embodiment, the method comprises the steps of: accessing a set of signal values representing an object that is detected on a sensor array during a scan operation; determining a touch area corresponding to the detected object on the sensor array, where the touch area is associated with multiple signal values from the set of signal values; computing a slope value for the detected object based on a ratio of a signal distribution value in the touch area to a metric indicating a size of the touch area with respect to the sensor array; determining whether to accept or to reject the detected object by performing a comparison of the slope value to a threshold; and rejecting the detected object based on the comparison. In one aspect of this embodiment, the detected object is rejected without computing or using a signal value representing pressure that is caused by the detected object on a touch-sensing surface of the sensor array. In another aspect, computing the slope value comprises multiplying the ratio to the highest value in the multiple signal values, and/or scaling the slope value to a one-byte value. In another aspect, rejecting the detected object further comprises comparing the size of the touch area to a minimum touch-area threshold, and rejecting the detected object when the size of the touch area is greater than the minimum touch-area threshold.

In another example embodiment, the techniques described herein may be implemented as a set of instructions that are stored in non-transitory firmware. Such instructions, when executed by a computing device, cause the computing device to perform the operations of the method (and its various aspects) for hard press rejection that is described above.

In another example embodiment, a device comprises a sensor coupled with a processing logic. The sensor is configured to measure a plurality of measurements from a sensor array during a scan operation, where the plurality of measurements represents an object that is detected on the sensor array. The processing logic is configured at least to: determine a touch area corresponding to the detected object on the sensor array, where the touch area is associated with multiple signal values that are derived from the plurality of measurements; compute a slope value for the detected object based on a ratio of a signal distribution value in the touch area to a metric indicating a size of the touch area with respect to the sensor array; and reject the detected object based on a comparison of the slope value to a threshold.

In another example embodiment, a system comprises a capacitive sensor array coupled with a capacitive sensor and a processing logic coupled with the capacitive sensor. The capacitive sensor array comprises a plurality of sensor elements. The capacitive sensor is configured to measure a plurality of measurements from the plurality of sensor elements during a scan operation, where the plurality of measurements represents an object that is detected on the capacitive sensor array. The processing logic is configured at least to: determine a touch area corresponding to the detected object on the capacitive sensor array, where the touch area is associated with multiple signal values that are derived from the plurality of measurements; compute a slope value for the detected object based on a ratio of a signal distribution value in the touch area to a metric indicating a size of the touch area with respect to the capacitive sensor array; and reject the detected object based on a comparison of the slope value to a threshold.

Example Operational Context

FIG. 1 illustrates a block diagram of one example embodiment of an electronic system 100 including a processing device 110 (e.g., such as a computing device) that may be configured to measure capacitances from a touch-sensing surface and to perform the techniques for hard press rejection described herein. The electronic system 100 includes a touch-sensing surface 116 (e.g., a touchscreen, a touch pad, or the like) coupled to the processing device 110 and a host 150. In some embodiments, the touch-sensing surface 116 is a two-dimensional user interface that uses a sensor array 121 to detect contacts on the surface 116.

In the example embodiment of FIG. 1, the sensor array 121 includes sensor elements 121(1)-121(N) (where N is a positive integer) that are disposed as a two-dimensional matrix (also referred to as an XY matrix). The sensor array 121 is coupled to pins 113(1)-113(N) of the processing device 110 via one or more analog buses 115 transporting multiple signals. In this embodiment, each sensor element 121(1)-121(N) is represented as a capacitor. The self capacitance of each sensor element in the sensor array 121 is measured by a capacitance sensor 101 in the processing device 110. Depending on the type of sensor array, in some embodiments the capacitance sensor may be configured to detect the mutual capacitance of a sensor element when a conductive object (e.g., stylus, user's finger, etc.) is in contact with the sensor element.

Capacitance sensor 101 may include a relaxation oscillator or other means to convert a capacitance into a measured value (or measurement). Capacitance sensor 101 may also include a counter or timer to measure the oscillator output. The capacitance sensor 101 may further include software components to convert the count value (e.g., capacitance value) into a sensor element detection decision (also referred to as switch detection decision) or relative magnitude. In some embodiments, the measured value (or measurement) obtained by capacitance sensor 101 may be a signal value that represents one or more characteristics of a signal; in addition, or instead of, in some embodiments a signal value may be a value that is derived from the measured value based on a signal characteristic, e.g., such as voltage and/or current magnitude, raw capacitance, and the like. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should also be noted that instead of evaluating the raw counts relative to a threshold, a capacitance sensor may be evaluating other measurements to determine the user interaction. For example, in a capacitance sensor having a sigma-delta modulator, the capacitance sensor may be evaluating the ratio of pulse widths of the output, instead of the raw counts being over or under a certain threshold.

In the example embodiment of FIG. 1, processing device 110 further includes processing logic 102. Operations of processing logic 102 may be implemented in firmware (e.g., such as a non-transitory computer-readable medium storing firmware instructions); alternatively, they may be implemented in hardware or software. Processing logic 102 is configured to perform operations that implement the techniques for hard press rejection as described herein. For example, processing logic 102 may receive raw measurements from capacitance sensor 101, derive a set of signal values from the raw measurements, determine a touch area corresponding to a detected object on the sensor array (with the touch area being associated with multiple signal values from the set of signal values), compute a slope value for the detected object based on a ratio of a signal distribution value in the touch area to a metric indicating a size of the touch area with respect to the sensor array, and reject the detected object based on a comparison of the slope value to a threshold.

In another embodiment, instead of performing the operations of the processing logic in a processing device (e.g., such as processing device 110), the processing device may send the raw data or partially-processed data to a host, e.g., such as host 150. As illustrated in FIG. 1, host 150 may include decision logic 151 that performs some or all of the operations described above for processing logic 102. Operations of decision logic 151 may be implemented in firmware, hardware, software, or a combination thereof. Host 150 may include a high-level Application Programming Interface (API) in applications 152 that perform routines on the received data, such as compensating for sensitivity differences, other compensation algorithms, baseline update routines, start-up and/or initialization routines, interpolation operations, scaling operations and/or operations that implement the techniques for hard press rejection as described herein. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

Processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, processing device 110 may be a programmable system on a chip such as, for example, a device from the Programmable System on a Chip (PSoC™) device families that are developed by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, processing device 110 may be a network processor having multiple processors including a core unit and multiple micro-engines. Additionally, processing device 110 may include any combination of general-purpose processing device(s) and special-purpose processing device(s).

In one embodiment, electronic system 100 is implemented in a device that includes touch-sensing surface 116 as the user interface, such as handheld electronics, portable and/or smart telephones, cellular telephones, notebook and laptop computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, electronic system 100 may be used in other types of devices. It should be noted that the components of electronic system 100 may include all the components described above. Alternatively, electronic system 100 may include only some of the components described above, or include additional components not listed herein.

Figure 2:
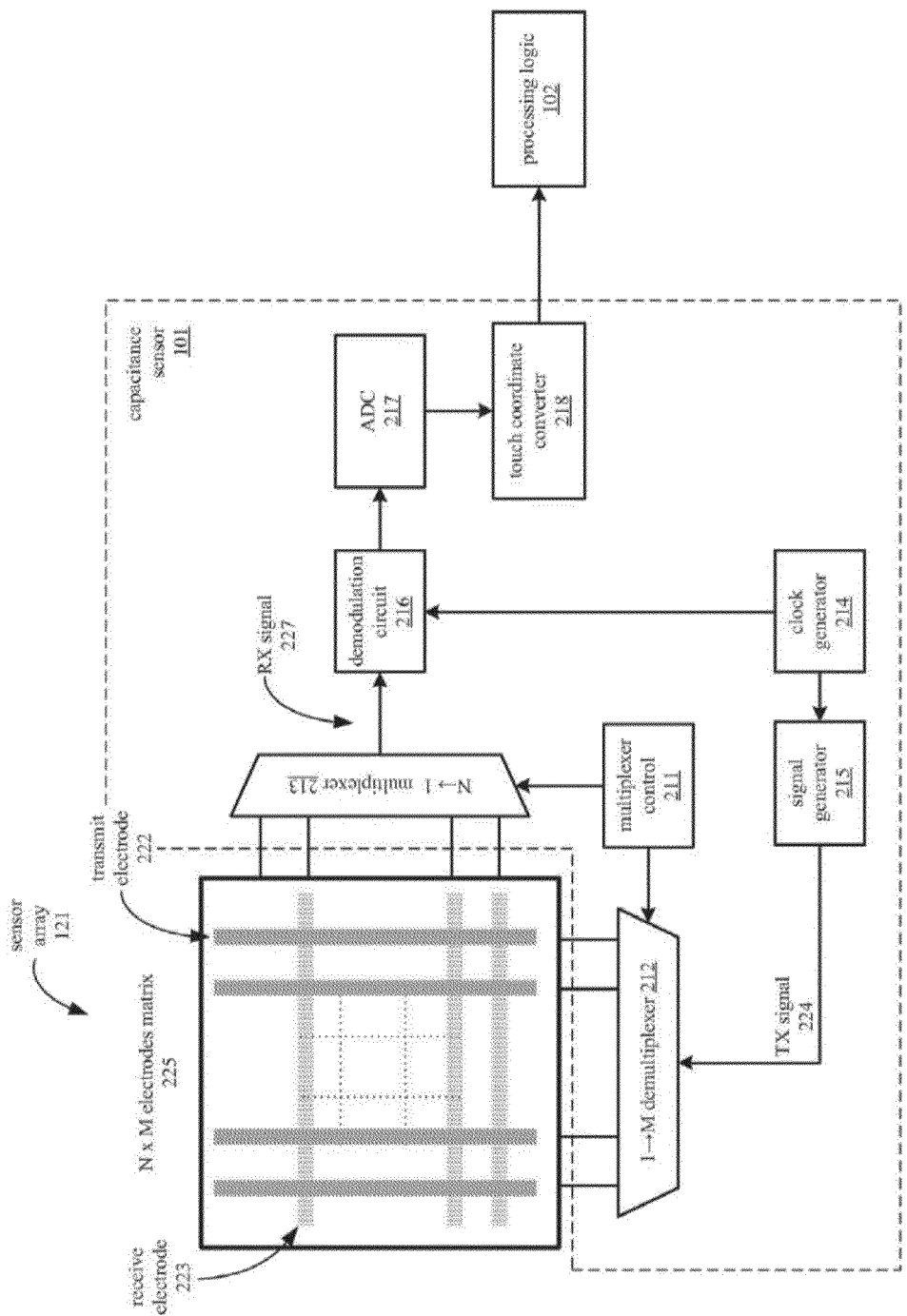
FIG. 2 is a block diagram illustrating an embodiment of an example sensor system that processes touch sensor data.

FIG. 2 is a block diagram illustrating one embodiment of a capacitive touch sensor array 121 and a capacitance sensor 101 that converts measured capacitances (or measurements) to coordinates. For example, the coordinates may be calculated based on the measured capacitances (or measurements). In one embodiment, sensor array 121 and capacitance sensor 101 are implemented in a system such as electronic system 100. Sensor array 121 includes a matrix 225 of N×M electrodes having N receive electrodes and M transmit electrodes. For example, matrix 225 includes transmit electrode 222 and receive electrode 223. Each of the electrodes in matrix 225 is connected with capacitance sensing circuit 201 through demultiplexer 212 and multiplexer 213.

It is noted that various sensor array designs can benefit from the techniques for hard press rejection described herein. For example, in various embodiments the techniques described herein may be implemented on measurements from sensor arrays that are constructed according to various different design technologies and various different electrode patterns. Such designs and technologies include, but are not limited to, single-solid-diamond (SSD) designs, doublesolid-diamond (DSD) designs, MH3 designs, metal mesh designs, single-layer electrode designs, multi-layer electrode designs, and any other known designs for various symmetric (and some non-symmetric) electrode patterns.

Capacitance sensor 101 includes multiplexer control 211, demultiplexer 212 and multiplexer 213, clock generator 214, signal generator 215, demodulation circuit 216, and analog to digital converter (ADC) 217. ADC 217 is further coupled with touch coordinate converter 218. Touch coordinate converter 218 outputs signals to processing logic 102.

The transmit (TX) and receive (RX) electrodes in matrix 225 may be arranged so that each of the TX electrodes overlap, cross, and/or is adjacent to each of the RX electrodes such as to form an array of sensor elements (e.g., at the overlaps, intersections, and/or adjacencies), while maintaining galvanic isolation from each other. Thus, each TX electrode may be capacitively coupled with each of the RX electrodes. For example, transmit electrode 222 is capacitively coupled with receive electrode 223 at the point where transmit electrode 222 and receive electrode 223 overlap.

In some embodiments (not shown), a capacitance sensor (e.g., such as sensor 101 in FIG. 1) may be configured to use mutual capacitance sensing technique(s) according to which a mutual capacitance present at the sensor element formed by two electrodes can be measured by a processing device (e.g., such as processing device 120 in FIG. 1). The change in this mutual capacitance at one or more intersections allows the processing device to determine the location of a contact on the sensor array. With mutual capacitance sensing, one set of electrodes (e.g., such as the column electrodes) are designated as transmit (TX) electrodes. During a scan operation, the transmit electrodes are driven with a TX signal that is applied to the TX electrodes by a transmit multiplexer. Another set of electrodes (e.g., such as the row electrodes) are designated as receive (RX) electrodes. The mutual capacitance of the sensor elements formed by the rows and columns may be measured by sampling a signal on each of the RX electrodes during the scan operation, where some embodiments may use a receive multiplexer to sample the signal on the RX electrodes and to provide the sampled signal to the processing device.

For example, in a scan operation a sensor applies signals to the TX electrodes of a sensor array over connection lines (e.g., such as metal traces, pins, vias, and the like) that connect the sensor array to the sensor, thereby recharging the sensor elements. A module in the sensor may apply a voltage or current to one or more of the TX electrodes, thereby causing a capacitance to be formed at their intersections or adjacencies with the RX electrodes of the sensor array. (It is noted that applying the voltage or current to the transmit electrodes is also referred to as "driving" the sensor elements.) The same (or a different) sensor module then measures the mutual capacitance (and/or the self-capacitance) of the sensor elements in the entire sensor array (or in a portion thereof).

Referring back to FIG. 2, clock generator 214 supplies a clock signal to signal generator 215, which produces a TX signal 224 to be supplied to the transmit electrodes of touch sensor 121. In one embodiment, signal generator 215 includes a set of switches that operate according to the clock signal from clock generator 214. The switches may generate a TX signal 224 by periodically connecting the output of signal generator 215 to a first voltage and then to a second voltage, where said first and second voltages are different.

The output of signal generator 215 is connected with demultiplexer 212, which allows a TX signal 224 to be applied to any of the M transmit electrodes of touch sensor 121. In one embodiment, multiplexer control 211 controls demultiplexer 212 so that the TX signal 224 is applied to each transmit electrode 222 in a controlled sequence. Demultiplexer 212 may also be used to ground, float, or connect an alternate signal to the other transmit electrodes to which the TX signal 224 is not currently being applied.

Because of the capacitive coupling between the transmit electrodes and the receive electrodes, a TX signal 224 applied to each transmit electrode during a scan operation induces a current within each of the receive electrodes. For instance, when the TX signal 224 is applied to transmit electrode 222 through demultiplexer 212, the TX signal 224 induces a receive (RX) signal 227 on the receive electrodes in matrix 225. The RX signal 227 (also referred to as touch signal) on each of the receive electrodes can then be measured in sequence by using multiplexer 213 to connect each of the N receive electrodes to demodulation circuit 216 in sequence. In some embodiments, RX signal 227 may represent the measured value of the charge displacement caused by an object detected on sensor array 121.

The mutual capacitance associated with each sensor element between a TX electrode and a RX electrode can be sensed by selecting every available combination of TX electrode and an RX electrode using demultiplexer 212 and multiplexer 213. To improve performance, multiplexer 213 may also be segmented to allow more than one of the receive electrodes in matrix 225 to be routed to additional demodulation circuits 216. In an optimized configuration, where there is a 1-to-1 correspondence of instances of demodulation circuit 216 with receive electrodes, multiplexer 213 may not be present in the system.

When an object approaches electrode matrix 225, the object may cause a decrease in the mutual capacitance between only some of the electrodes. For example, if a finger is placed near the sensor element formed by transmit electrode 222 and receive electrode 223, the presence of the finger will decrease the mutual capacitance between electrodes 222 and 223. Thus, the location of the finger on the touch-sensing surface of sensor array 121 can be determined by identifying the one or more receive electrodes having a decreased mutual capacitance in addition to identifying the transmit electrode to which the TX signal 224 was applied at the time the decreased mutual capacitance was measured on the one or more receive electrodes.

By determining the mutual capacitances associated with each sensor element formed by the electrodes in the matrix 225, the locations of one or more contacts on the touch-sensing surface of sensor array 121 may be determined. The determination may be sequential, in parallel, or may occur more frequently at commonly used electrodes.

In some embodiments, other methods for detecting the presence of a finger or other object may be used where the finger or object causes an increase in capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined from the locations of one or more electrodes at which an increased capacitance is detected.

The induced RX signal 227 is rectified by demodulation circuit 216. The rectified current output by demodulation circuit 216 can then be filtered and converted to a digital code by ADC 217.

The digital code may then be converted by touch coordinate converter 218 to touch coordinates indicating a position of an input on sensor array 121. The touch coordinates are transmitted as an input signal to processing logic 102. In one embodiment, the input signal is received at an input to processing logic 102. In one embodiment, the input may be configured to receive capacitance measurements indicating a plurality of row coordinates and a plurality of column coordinates. Alternatively, the input may be configured to receive row coordinates and column coordinates.

In some embodiments, processing logic 102 may be configured to generate (or to receive, e.g., from touch coordinate receiver 218) capacitance measurements that can be used to derive signal values, e.g., such as diff signals (also referred to as "diff signal values"). For example, processing logic 102 may be configured to determine a signal value (e.g., such as a diff signal) for a given sensor element as the difference between the settled (e.g., expected or fully charged) baseline capacitance of a sensor element (e.g., when an object is not in contact with the sensor array and the sensor array is not being scanned) and the capacitance of the sensor element that is measured as part of a scan operation (e.g., when an object may or may not be in contact with the sensor array). The capacitance used to compute a signal value (e.g., such as a diff signal) for a sensor element may be a self-capacitance and/or a mutual capacitance of the sensor element.

In various embodiments, the processing logic may compute the signal values (e.g., such as diff signals) for each of the sensor elements in a sensor array based on capacitance measurements that represent the self-capacitances and/or the mutual capacitances of the sensor elements. For example, a self-capacitance of a given sensor element may include a capacitance formed between the sensor element and a reference voltage (e.g., such as ground). A mutual capacitance of a given sensor element may include a capacitance induced between the electrodes that form the sensor element and/or between one or more conductive objects (e.g., such as a stylus or user's finger) or non-conductive objects (e.g., under hard press conditions) that are electrically insulated from the sensor element.

In various embodiments, demodulation circuit 216, ADC 217, touch coordinate converter 218, and processing logic 102 may be included in an integrated or modular touchscreen controller. Such touchscreen controller may be configured and operable to drive TX electrodes, to measure the charge on multiple RX electrodes simultaneously, to perform charge conversion to an ADC code (also referred to as "raw" measurements), and to further process the ADC code to determine the location of a detected object on the touch-sensing surface of a sensor array.

Comparative Hard Press Examples

One of the issues caused by a hard press is a false contact that is not intended or knowingly made by a user, but that is nevertheless processed and acted upon by a touch-input device. Some techniques that may at least partially address the false contact issue involve computing an absolute signal value representing the pressure applied by an object to the touch-sensing surface of a sensor array, and then rejecting the contact by the object based on a comparison of the magnitude of the pressure signal value to a threshold. Other techniques that may at least partially address the false contact issue involve detecting the area of the contact, comparing the absolute peak signal value in this area to a pre-configured threshold, and reporting the contact for further processing if the peak signal value exceeds the threshold. In addition to such comparison, some techniques may provide for rejecting spike noise by comparing a sum of a predetermined and fixed (e.g., 3×3 sensor elements) area around the peak signal value to pre-determined and fixed threshold (e.g., 2× or 4× value of a finger threshold), and rejecting the contact that caused the peak signal value if the sum is less than the threshold. However, all of these techniques fail to fully address, and provide a solution for, a false contact that is caused by a hard press. This is in part because all of these techniques do not to take into account the shape of the touch area caused by a hard press contact, but rather rely on absolute signal values that can be easily exceeded during a hard press or a contact through a leather/plastic cover.

The techniques for hard press rejection described herein provide a solution to the problem of a false contact caused by a hard press by taking into account the shape of the touch area of a contact caused by a hard press. Further, in some embodiments a detected object is rejected without computing or using a signal value representing pressure that is caused by the detected object on a touch-sensing surface of a sensor array.

In some embodiments, a capacitive sensor array may include sensor elements that are formed by rows and columns of intersecting (or adjacent) electrodes. One set of the electrodes are usually TX electrodes and the other set are RX electrodes. As a result of measuring the mutual capacitance $C_M$ between the pair of TX and RX electrodes that form each sensor element during a scan operation, a data structure of diff signal values may be derived and stored on a computing device.

In such data structure, the signal values may be arranged according to an organization that associates the positions of the signal values in the data structure with the locations, in the sensor array, of the respective sensor elements from which the signal values were derived. Examples of such data structures include, without limitation, a matrix, an array, a table, an indexed list, and any other suitable data structure that can correlate the locations of the sensor elements in a sensor array with the positions of their corresponding signal values in the data structure.

For example, a matrix (or array) having M rows and N columns may be used to store the signal values derived from the sensor elements in a sensor array that is formed by M RX electrodes and N TX electrodes. When a conductive object is placed on the touch-sensing surface of the sensor array, it reduces the mutual capacitance $C_M$ between the sensor elements underneath the object and the device (or its touchscreen controller) registers this change in capacitance. The capacitance change may then be converted to a signal value that is stored in the result matrix.

FIG. 3 illustrates the signal values corresponding to an example contact by a normal human finger, which should be treated as a true contact by a touch-input device. Specifically, FIG. 3 illustrates a portion 300 of a data structure that stores diff signal values, where the signal values were derived from a plurality of measurements that were measured from a plurality of sensor elements of a sensor array during a scan operation. In the context of hard press rejection, "sensor element" refers to the minimal discrete unit or location (e.g., overlap, intersection, and/or adjacency) of electrodes in a sensor array from which a measurement or signal can be obtained that is separate and different from measurements/signals obtained from other units or locations in the sensor array.

A sensor or processing logic (not shown) that operates on data structure portion 300 stores/associates a separate index value for each separate transmit (TX) electrode that is used to form a sensor element on the sensor array, where the index values are arranged in a sequence representing a physical arrangement of the TX electrodes in the sensor array; similarly, the sensor or processing logic also stores/associates a separate index value for each separate receive (RX) electrode that is used to form a sensor element, where the index values are arranged in a sequence representing a physical arrangement of the RX electrodes in the sensor array. Using the data structure portion 300 in FIG. 3 as an example, TX index 302 includes a sequence of integer values ranging from 0 to 5 that represent 6 transmit electrodes; similarly, RX index 304 includes a sequence of integer values ranging from 0 to 6 that represent 7 receive electrodes.

Each signal value stored in data structure portion 300 is respectively associated with a corresponding sensor element in a sensor array, where the position of the signal value within the data structure corresponds to the physical location of the corresponding sensor element in the sensor array. FIG. 3 also illustrates that data structure portion 300 stored the signal values, obtained by a given scan operation at a given point in time, for each of the corresponding sensor elements in the sensor array. For example, signal value 306 (having a value of "2") is measured or otherwise obtained for the sensor element located at the intersection of the transmit electrode with TX index of "4" and the receive electrode with RX index of "3". It is noted that since various embodiments may use sensor arrays with various numbers of transmit and receive electrodes and various numbering schemes for the corresponding TX and RX indexes, the techniques for hardware rejection described herein are not limited to any particular number of electrodes or to any particular indexing scheme. Thus, the data structure and its TX and RX indexes depicted in FIG. 3 are to be regarded in an illustrative rather than a restrictive sense.

In FIG. 3, the signal values stored in data structure portion 300 are obtained based on measurements from a scan operation at a given point in time. The signal values indicate that a contact 308 is present on the touch-surface of the sensor array. It is noted that the signal values in FIG. 3 represent the state of the sensor elements of the sensor array at the time the scan operation is performed—thus, the contact illustrated in FIG. 3 may be a stationary contact (e.g., a tap) or may be part of a more complex gesture (e.g., a scrolling gesture).

In the example of FIG. 3, contact 308 is from a normal finger that should be treated as a true object. This is because for normal/true contacts (without the impact of other things such as noise, water, etc.), typically only the touch area straight under a contact (e.g., finger) detects the most signal. Thus, the area of contact 308 (as illustrated by the thick line in FIG. 3) would substantially correspond to the actual size of the finger contacting the touch-sensing surface of the sensor array.

However, when a hard press from a non-conductive object occurs, it typically pushes the touch-sensing surface of the sensor array towards the structure (e.g., such as a LCD display) of the touch-input device underneath. Thus, while the non-conductive object does not add to the capacitance between the electrodes of the sensor elements of the array, the deformation of the touch-sensing surface increases the parasitic capacitance (denoted $C_P$) of each sensor element affected by the deformation. Depending on the air gap between the touch-sensing surface and the structure underneath it and on the capacitive parameters of the electrodes, the impact of the touch-sensing surface deformation can result in unwanted mutual capacitance detection in the area of the hard press.

Figure 4:
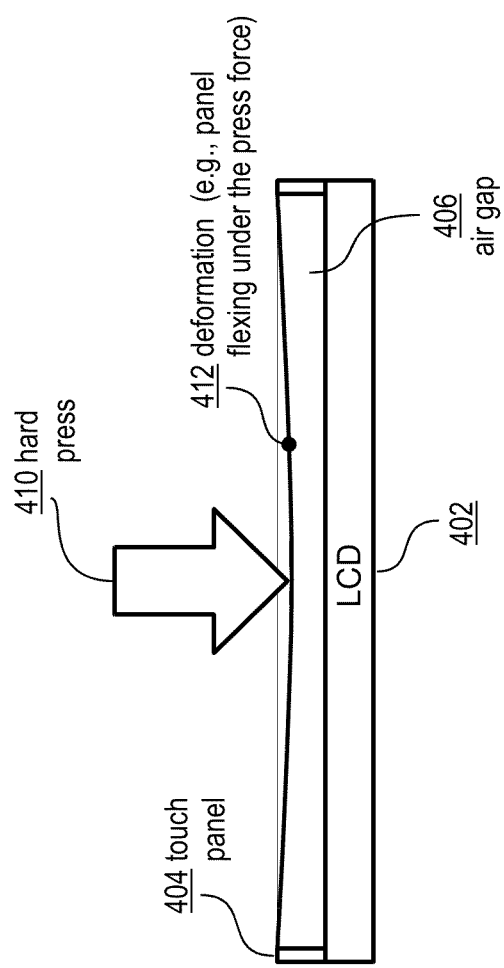
FIG. 4 is block diagram illustrating an example hard press on a touchscreen according to an example embodiment.

FIG. 4 illustrates an example of a hard press on a touch panel such as a touchscreen. In some embodiments such as the embodiment of FIG. 4, a touch panel (e.g., such as touch panel 404) may include transparent material (e.g., such as graphene or ITO) that is formed into RX and TX electrodes. In these embodiments, the touch panel is typically placed above an LCD display (e.g., such as LCD 402), with an air gap (e.g., such as air gap 406) between them. The cover lenses of the touch panel are typically made from glass or plastic. Since such material is relatively hard, any flexing of the touch panel under a contact occurs along most of the panel instead of only under the point of impact.

For example, as illustrated in FIG. 4, a hard press 410 causes deformation 412 of touch panel 404 such that the touch panel flexes under the press force. Hard press 410 reduces air gap 406, which causes a mutual capacitance signal that is distributed proportionally to the decreases of the distance from touch panel 404 to LCD 402. Thus, the profile of hard press 410 will look like a flat wide touch with relatively low signal amplitude. In other words, the hard press will be like the contact from an object with a flat signal slope. In contrast, the contact caused by a real finger without the hard press would typically have a touch area that is small relative to the panel size and a signal that is relatively high (e.g., because of the conductive properties of the finger), which would translate to a steep signal slope of the finger.

Examples of Determining Slope Values for Touch Areas

The techniques described herein utilize slope detection and compute a slope value for a touch area of a contact in the process of identifying and rejecting a hard press.

Figure 5A:
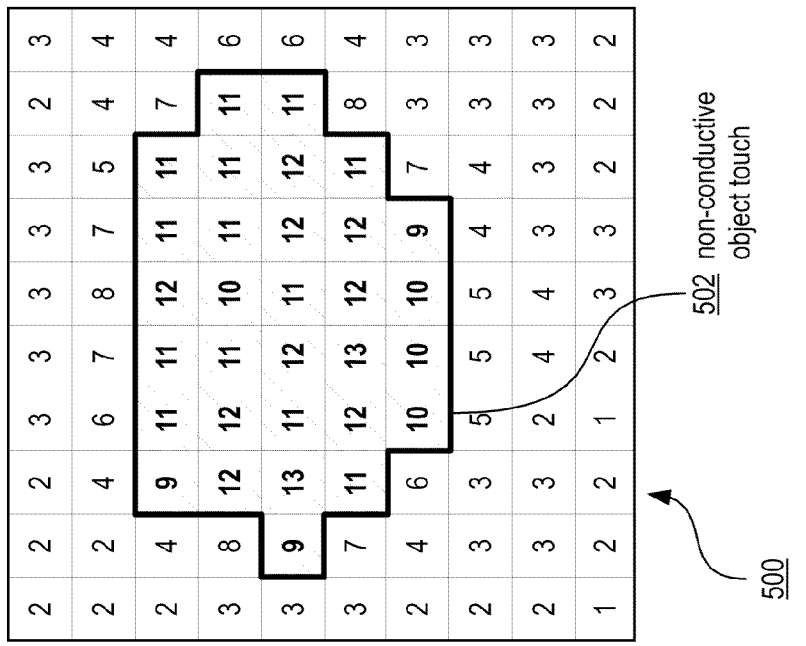
FIG. 5A is a block diagram illustrating an example contact with the pressure by a non-conductive object as described in FIG. 4 according to an example embodiment.

For example, FIGS. 5A-5C illustrate data structure portion 500 that stores signal values that were generated under different hard press conditions. Specifically, FIG. 5A illustrates the signal values for contact 502 by a non-conductive object. FIG. 5B illustrates the signal values for contact 504A by a normal finger through a 2 mm leather cover, and FIG. 5C illustrates the signal values for contact 504B by a fat finger (e.g., a thumb) through the 2 mm leather cover. As illustrated by the signal values in data structure portion 500 of FIGS. 5A-5C, the touch areas of contacts 502, 504A, and 504B are wide with relatively low signal magnitude when compared to the touch area of the contact by a real finger as illustrated in FIG. 3. Thus, the techniques described herein would reject contacts 502, 504A, and 504B based on slope values that are computed for the touch areas of these contacts.

Figure 6D:
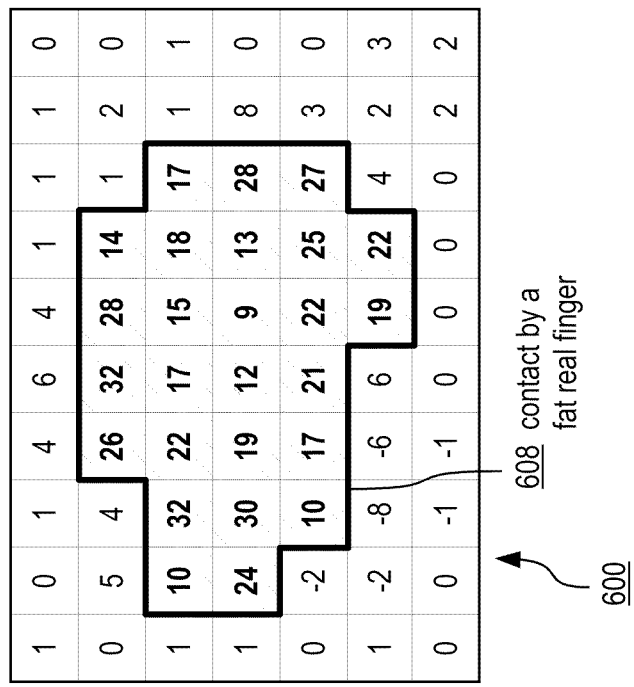
FIG. 6D is a block diagram illustrating an example contact by a fat finger according to an example embodiment.

In another example, FIGS. 6A-6E illustrate data structure portion 600 that stores signal values that were generated by various conductive objects. Specifically, FIG. 6A illustrates the signal values for contact 602 by a 4 mm finger. FIG. 6B illustrates the signal values for contact 604 by a 5 mm finger. FIG. 6C illustrates the signal values for contact 606 by a normal finger (e.g., such as typical human finger). FIG. 6D illustrates the signal values for contact 608 by a fat finger, and FIG. 6E illustrates the signal values for contact 610 by a human fist. As illustrated by the signal values in data structure portion 600 of FIGS. 6A-6E, the touch areas of contacts 602, 604, 606, 608, and 610 have signal values of relatively high magnitudes (when compared to the magnitudes of the signal values of the hard press contacts illustrated in FIGS. 5A-5C), and the slopes of the touch areas are pretty steep without any significant tails around them. (In this context, "slope" refers to the value drop-off between a signal value on the edge within the contact touch area and a signal value just outside the edge of the contact touch area). Thus, the techniques described herein would accept as normal the contacts 602, 604, 606, 608, and 610 based on slope values that are computed for the touch areas of these contacts.

Figure 7:
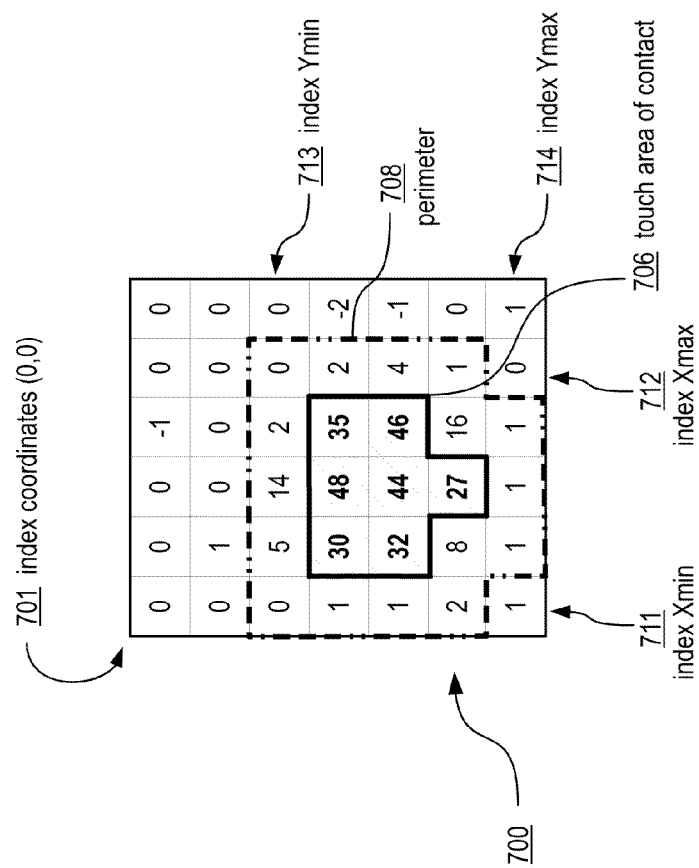
FIG. 7 is a block diagram illustrating an example touch area within a perimeter according to an example embodiment.

FIG. 7 illustrates an example touch area within a perimeter. As used herein, "touch area" refers to a set of signal values that corresponds to a contact by an object. The signal values in a touch area are derived from measurements obtained from a continuous group of sensor elements that are affected by a contact on the touch-sensing surface of a sensor array. Thus, the signal values in a touch area correspond to a physical location (or set of locations) on the sensor array and to the corresponding signals that are measured from the (RX and/or TX) electrodes at that location or set of locations on the sensor array. For the purposes of illustrating examples of how a touch area and the slope value thereof can be determined, data structure portion 700 in FIG. 7 stores the signal values for the contact illustrated in FIG. 3. Also for the purposes of illustration, the cell at the top-left corner of data structure portion 700 is designated with coordinates 701 having the TX and RX index values of "(0,0)", respectively.

Touch Area Determination

In an example embodiment, when a scan operation performed on a sensor array is complete and the signal values derived from there are stored in a data structure (e.g., such as a matrix), a computing device or a processing logic thereof searches the data structure for touch area(s) of contact(s) by object(s) on the sensor array. First, the computing device looks for single local maximums that are over a user-defined threshold, where a single local maximum is a signal value that is larger than the signal values surrounding it in the data structure. Then, for each local maximum that is found to be above the threshold, the computing device checks and identifies the surrounding signal values that are bigger than the local maximum signal value multiplied by a coefficient (which may also be user-defined, e.g. such as "0.5"). The signal values identified in this manner form the touch area of a contact, and the signal values that are immediately next to the edge signal values of the touch area (e.g., the signal values that border the touch area) form the perimeter of the touch area.

Using FIG. 7 as an example, a computing device checks the signal values in data structure portion 700 and determines that the signal value having a magnitude of "48" is a local maximum. Then, using a coefficient of "0.5", the computing device checks and identifies all surrounding signal values that have a magnitude of "24" or greater (since 48*0.5=24). The signal values, which have a magnitude of "24" or greater and which form a contiguous group around the local maximum, are identified as being included in the touch area 706. The signal values, which have a magnitude less than "24" and which border (e.g., are immediately adjacent to) a signal value included in touch area 706, are identified as being included in perimeter 708.

Slope Value Computation

After determining the signal values in the touch area, the techniques described herein provide for computing the slope value for the touch area of the contact made by an object on a sensor array. In some embodiments, the slope value computation can be performed by using equation (1) below:

$$\text{slope\_value} = \frac{\left(\sum S_i\right)/\text{area\_size}}{\max((x_{max} - x_{min}), (y_{max} - y_{min}))} \quad (1)$$

where:
slope_value is the slope value being calculated,
$S_i$ represents a signal value for one (e.g., $i^{th}$) individual sensor element (or cell) in the touch area,
area_size is the number of signal values in the touch area, $x_{max}$ and $x_{min}$ are the maximum and minimum indexes (or index values) of perimeter signal values that border the signal values of the touch area along one dimension (e.g., such as length), and $y_{max}$ and $y_{min}$ are the maximum and minimum indexes (or index values) of perimeter signal values that border the signal values of the touch area along another dimension (e.g., such as width).

In equation (1) above, "$(\Sigma S_i)$/area_size" represents an example of a mean signal value in the touch area; "max$((x_{max}-x_{min}),(y_{max}-y_{min}))$" represents an example of a metric indicating a size of the touch area along the larger of the length and the width dimensions of the touch area; and "slope_value" represents an example of a ratio of the mean signal value to the size metric of the touch area.

More generally, "signal distribution value" in a touch area refers to a value that represents some distribution of the signal within the touch area; the mean signal value in equation (1) above is one example of a signal distribution value. "Metric" (or "size metric") indicating a size of the touch area refers to a value that numerically quantifies the touch area along one or more dimensions (e.g., such as length, width, etc,). "Slope value" refers to the relationship that exists between the distribution of the signal values within the touch area and a size of the touch area relative to the underlying sensor array. In various embodiments and implementations, the signal distribution value of a touch area may be computed by using various statistical and/or other functions that are suitable for operating on multiple signal values; the size metric of the touch area may be any suitable value (as expressed in suitable measurement units) that reflects various size properties of the touch area that can be determined with respect to the corresponding sensor array; and therefore the slope value for a touch area may reflect various relationships between various distributions representing the signal values in the touch area and various size properties of the touch area. Thus, the examples of mean signal value, size metric, slope value of a touch area, which are discussed above with respect to equation (1), are to be regarded in an illustrative rather than a restrictive sense.

Using FIG. 7 as an example, a computing device can calculate the slope value for touch area 706 by using equation (1) to perform the following computations:

$$\Sigma S_i = 30+48+35+32+44+46+27=262;$$

$$\text{area\_size} = 1+1+1+1+1+1+1=7$$

(i.e., the touch area includes 7 signal values);

$$x_{max} - x_{min} = 4-0=4,$$

where index 712 (Xmax) has the value of "4" and index 711 (Xmin) has the value of "0" based on the index coordinates 701 "(0,0)" of the cell at the top-left corner of data structure portion 700;

$$y_{max} - y_{min} = 6-2=4,$$

where index 714 (Ymax) has the value of "6" and index 713 (Ymin) has the value of "2" based on the index coordinates 701 "(0,0)" of the cell at the top-left corner of data structure portion 700; and finally $$\text{slope\_value} = \frac{262/7}{\max((4),(4))} = \frac{37.42857}{4} \approx 9$$

Thus, by using equation (1), the computing device can compute a slope value of "9" for the touch area 706.

In some embodiments and/or operational contexts, the touch area from a hard press and the touch area from a real large conductive object may be proportional. In this case, the ratio computed for the hard press (between the signal distribution value of the touch area of the hard press and the size metric of the touch area) and the ratio for the large conductive object (between the signal distribution value of the touch area of the large object and the size metric of the touch area) can be identical. To address this case, equation (2) below may be used to normalize the computed slope value for the touch area of the contact by multiplying it to the local maximum signal value. Equation (2) is a modification of equation (1) as follows:

$$\text{slope\_value} = \frac{\left(\sum S_i\right)/\text{area\_size}}{\max((x_{max} - x_{min}), (y_{max} - y_{min}))} * S_{local\_max} \quad (2)$$

where $S_{local\_max}$ local max represents the local maximum signal value in the determined touch area. It is noted that equation (2) can help to distinguish between a hard press and a large conductive object because (as illustrated above in FIGS. 5A-5C and 6A-6D) the local maximum signal value of a hard press would be smaller in magnitude than the local maximum signal value of a real large conductive object.

Using FIG. 7 as an example, a computing device can calculate the slope value for touch area 706 by using equation (2) to perform the following computations:

$\Sigma S_i = 262$, area_size=7, $x_{max} - x_{min} = 4$, $y_{max} - y_{min} = 4$, $S_{local\_max} = 48$, which is the local maximum signal value in touch area 706, and finally $$\text{slope\_value} = \frac{262/7}{\max((4),(4))} = \frac{37.42857}{4} * 48 \approx 449$$

Thus, by using equation (2), the computing device can compute a slope value of "449" for the touch area 706.

In some embodiments, the multiplication to the local maximum signal value in equation (2) may result in a slope value that occupies multiple bytes of memory (or other non-transitory storage). Since the techniques for hard press rejection described herein are applied to the touch areas of multiple detected contacts per each scan operation, computing and storing multiple slope values may require a substantial amount of memory (or other storage space). In order to reduce the memory (or other storage space) for storing slope values and for other efficiency reasons (e.g., such as faster computation), in some embodiments the techniques described herein provide for scaling the computed slope value (or the ratio on which it is based) to a one-byte value (e.g., to a value that is 1 byte in size). An example of such scaling operation is provided in equation (3) below. Equation (3) is a modification of equation (2), in which a bit-wise right-shift operation is used to divide the computed ratio by 8 in order to scale it down to 8 bits (e.g., to an unsigned small integer):

$$\text{slope\_value} = \left(\frac{\left(\sum S_i\right)/\text{area\_size}}{\max((x_{max} - x_{min}), (y_{max} - y_{min}))} * S_{local\_max}\right) \gg 3 \quad (3)$$

where ">>3" represents a bit-wise right-shift operation that is equivalent to an unsigned division by $2^3$ (i.e., by 8, since $2^3=8$).

Using FIG. 7 as an example, a computing device can calculate the slope value for touch area 706 by using equation (3) to perform the following computations:

$\Sigma S_i = 262$, area_size=7, $x_{max} - x_{min} = 4$, $y_{max} - y_{min} = 4$, $S_{local\_max} = 48$, and finally $$\text{slope\_value} = \left(\frac{262/7}{\max((4),(4))} * 48\right) \gg 3 = \frac{\left(\frac{37.42857}{4} * 48\right)}{8} \approx 56$$

Thus, by using equation (3), the computing device can compute a slope value of "56" for the touch area 706.

Rejection Threshold Comparison

After determining the slope value for the touch area of a detected object, the techniques described herein provide for comparing the slope value to a threshold in order to determine whether to accept the object as a normal contact or to the reject the object (and the contact thereof) as a hard press. For example, if the slope value for a given touch area is lower than a certain threshold, the object and its contact on the sensor array are rejected as a hard press. Such rejection may be performed in various ways including, but not limited to, not reporting the contact and its data to a downstream processing host or application, discarding the contact data without reporting it to the host or an active application thereof, and any other suitable mechanism that blocks the hard press contact data from any further processing.

Figure 8:
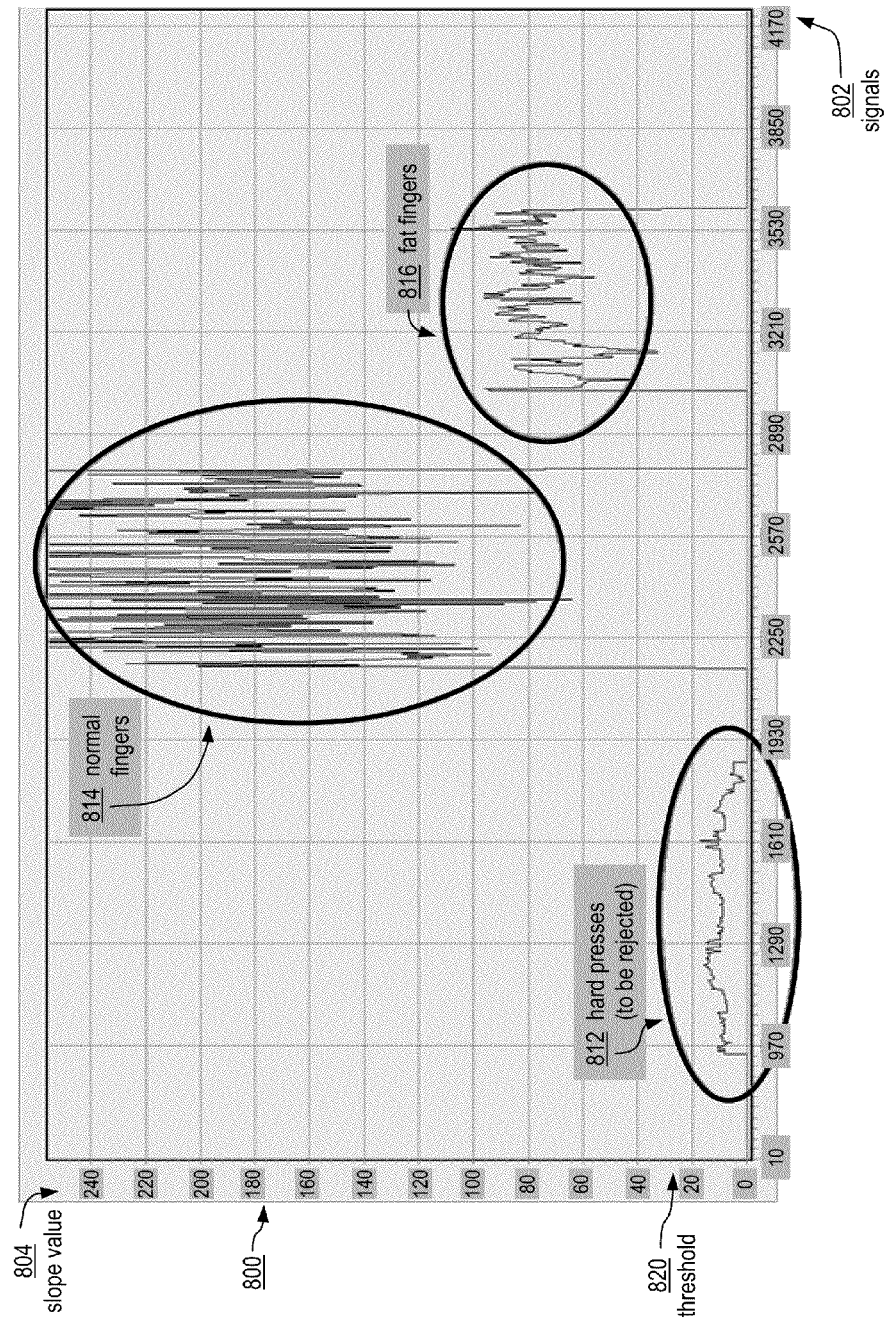
FIG. 8 is a graph illustrating an example slope value threshold with respect to measured slope values for hard presses, normal fingers, and fat fingers according to an example embodiment.

FIG. 8 illustrates an example of a population of slope values that are experimentally computed for different objects in an embodiment that uses ratio normalization and slope value scaling (e.g., such as the normalization and scaling described above for equations (2) and (3)). In graph 800, the horizontal axis 802 reflects touch area signals and the vertical axis 804 reflects scaled slope values that are computed for hard presses 812, normal fingers 814, and fat fingers 816. As illustrated in the graph, the signal magnitudes from hard press events are significantly lower than the signal magnitudes from normal fingers and fat fingers (or other large conductive objects).

Based on the examples from the embodiment illustrated in FIG. 8, a threshold for rejecting a hard press can be set to a value that is at or over 110% of the maximum (e.g., the maximum slope value +10%) of the slope values computed for contacts that have to be rejected or suppressed (e.g., such as hard presses 812) and below most or all of the minimums of the slope values for contacts by fat fingers 816 and normal fingers 814 that have to be accepted. Thus, from the examples illustrated in FIG. 8, an acceptable (or even optimal) threshold value may be somewhere in the range of "22-32", where the top of the threshold range should be below the minimum slope value computed for fat fingers 816. It is noted that depending on various operational characteristics and use cases, various embodiments and implementations may use various approaches to determine their hard press rejection thresholds; thus, the example rejection threshold described with respect to FIG. 8 is to be regarded in an illustrative rather than a restrictive sense.

Contact Filtering

In some embodiments, the operations (e.g., such as touch area determination, slope value computation, and rejection threshold comparison) of the techniques described herein are performed for every object which is detected (e.g., as present) on a sensor array during a scan operation.

Alternatively, in some embodiments the techniques described herein are performed after every scan operation that detects a new object on the touch-sensing surface of the sensor array. For example, in these embodiments the operations of touch area determination, slope value computation, and rejection threshold comparison are performed only if the contact of a detected object is not preceded by another contact, which corresponds to the same detected object and which was detected in a previous scan operation. This results in computational efficiency since the hard press rejection techniques are effectively performed only for newly-detected, "first touch" objects that were not present during the previous scanning cycle. Further, performing the techniques for hard press rejection only for scan operations that detect new objects may improve the overall accuracy of the contact detection processing because some mechanisms (e.g., such as fast finger tracking and finger tracking with noise) in such processing can occasionally glitch below the threshold and reject a normal contact. For example, performing the techniques for hard press rejection in such manner reduces the complexity in identifying a new contact with a local maximum location mechanism since the contact ID of the contact is calculated only after the position calculation is finished and the object is accepted. (In other words, a detected object that is rejected as a hard press is not further processed for contact identification and contact ID assignment.)

Example Methods for Hard Press Rejection

In some embodiments, the techniques for hard press rejection described herein can be implemented as an add-on process that is performed as part of regular contact detection processing. In other embodiments, the techniques described herein can be performed as a stand-alone process that is invoked in response to some event such as, for example, the detection of a new object during a scan operation on a sensor array.

Figure 9:
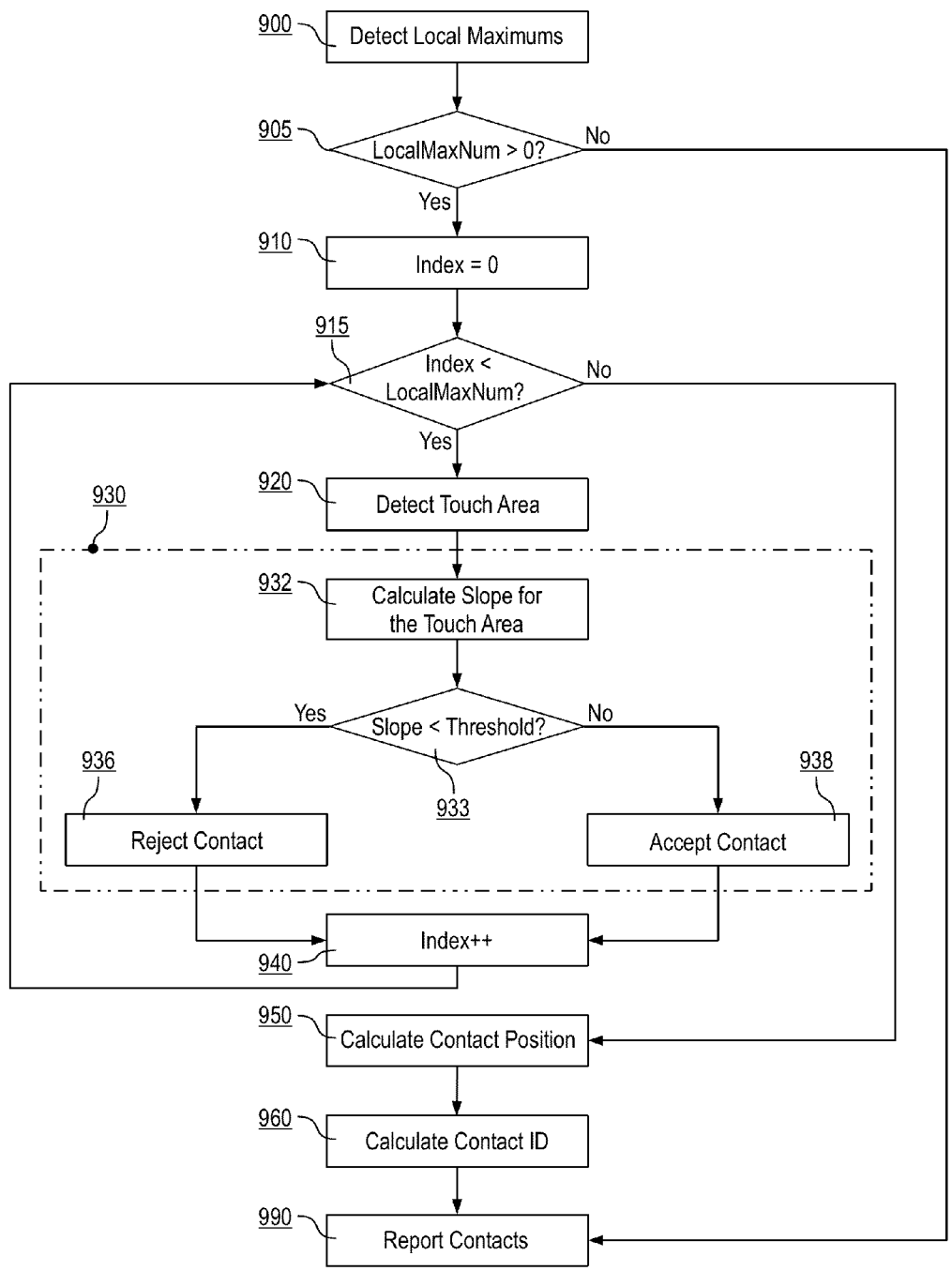
FIG. 9 illustrates an example method of hard press rejection according to example embodiments.

FIG. 9 illustrates an example method for hard press rejection. The operations of the method in FIG. 9 are described hereinafter as being performed by a processing logic (e.g., such as processing logic 102 in FIG. 1). It is noted, however, that various implementations and embodiments may use various, and possibly multiple, components to perform the operations of the method in FIG. 9. For example, in various embodiments a processing logic may be implemented in various ways including, but not limited to: as a set of stored software and/or firmware instructions which, when executed by one or more processors, are operable to perform one or more operations; as one or more software components (e.g., software modules, libraries of functions, compiled and/or interpretable object-oriented classes, dynamically linked libraries, and the like) that are executable by one or more hosts or applications on a computing device; and as any combination(s) of one or more software components and one or more hardware components (e.g., processors, microcontrollers, Application-Specific Integrated Circuits (ASICs), and the like). In another example, in various embodiments a processing logic may be implemented in a single integrated component or its functionality may be spread across two or more components that may perform some additional operations and functionalities. Thus, the description hereinafter, of the method in FIG. 9 as being performed by a processing logic, is to be regarded in an illustrative rather than a restrictive sense.

Prior to the operations in block 900, a scan operation performed on a sensor array has completed and the signal values derived therefrom have been stored in a data structure (e.g., such as an array or a signal matrix).

In block 900, a processing logic searches the data structure for single local maximums that are over a user-defined threshold, where a single local maximum is a signal value that is larger than the signal values surrounding it in the data structure. For example, the processing logic may compare each signal value to each of its neighbors, and may decide that a given signal value is a local maximum when none of its neighbors have a higher value. The processing logic then determines the number of the local maximums that are found by this search, and sets to that number a programming variable (e.g., such as the "LocalMaxNum" variable illustrated in FIG. 9). For example, if the processing logic does not find any local maximums that are above the threshold, then the "LocalMaxNum" variable would be set to "0"; otherwise, the "LocalMaxNum" variable would be set to the number of the found local maximums.

In block 905, the processing logic checks whether any local maximums were found by comparing the "LocalMaxNum" variable to "0". If the "LocalMaxNum" variable is "0" (or less), then no local maximums were found and the processing logic proceeds to block 990. If the "LocalMaxNum" variable is greater than "0", then the processing logic has found some local maximums and thus proceeds to block 910.

In block 910, the processing logic initializes to "0" a programming variable (e.g., such as the "Index" counter in FIG. 9) that is used for looping through each of the local maximums in turn. In block 915, the processing logic compares the local maximum index counter to the "LocalMaxNum" variable. If the index counter is not less than the "LocalMaxNum" variable, then all local maximums have been processed for hard press rejection and the processing logic continues to block 950. If the index counter is less than the "LocalMaxNum" variable, then there are some outstanding local maximums that still need to be processed, and the processing logic continues to block 920 to process the next/current outstanding local maximum.

In block 920, the processing logic determines the touch area for the local maximum that is currently being processed. For example, the processing logic checks and identifies any surrounding signal values that are bigger than a value that is the multiplication product of the current local maximum and a coefficient (e.g. such as "0.5"). The signal values identified in this manner around the local maximum form the touch area of a contact that is associated with the local maximum. The signal values, which are immediately next to the signal values on the edge of the touch area, form the perimeter of the touch area. In some embodiments, the processing logic may perform some additional local maximum processing (also referred to as "parts area search") in order to combine, into a single contact, two or more local maximums that are part of the same contact as determined based on some pre-defined conditions. For example, in these embodiments the processing logic may find whether two or more local maximums need to be merged into a single contact, and if so the processing logic combines the touch areas of the two or more local maximums into a single touch area.

After detecting the touch area for the current local maximum, in block 930 (and the operations therein) the processing logic performs the techniques for hard press rejection as described heretofore. Specifically, in block 932 the processing logic computes the slope value for the touch area of the current local maximum. For example, in some embodiments the processing logic uses equation (3) above, and computes the mean signal value of the touch area and a metric indicating a size of the touch area (e.g., such as a length, width, etc., or some other size property). The processing logic then computes the ratio of the mean signal value to the size metric, normalizes the computed ratio by multiplying it to the value of the current local maximum, and scales the result to obtain the slope value for the touch area.

In block 933 the processing logic compares the computed slope value to a hard press threshold. If in block 933 the processing logic determines that the slope value is less than the threshold, this means that the touch area represents a hard press that needs to be rejected; accordingly, the processing logic proceeds to block 936 and rejects the contact by a suitable mechanism (e.g., such as setting a flag associated with the contact, storing/changing a property associated with the contact, etc.) If in block 933 the processing logic determines that the slope value is greater than or equal to the threshold, this means that the touch area represents a contact by a normal object that needs to be accepted; accordingly, the processing logic proceeds to block 938 and accepts the contact by a suitable mechanism. After completing the operations in each of blocks 936 and 938, the processing logic proceeds to block 940 and increments the index counter which indicates the local maximum that is currently being processed. Then, from block 940 the processing logic proceeds back to block 915 in order to process the next local maximum indicated by the index counter.

In this manner, the processing logic processes each local maximum in turn and determines whether the contact corresponding to each local maximum is accepted as a normal contact or is rejected as a hard press. In accordance with the techniques described herein, the processing logic uses a signal distribution value and a size metric of the touch area (e.g., length, width, etc.) to characterize the corresponding contact by a slope value that roughly represents an angle of a slope indicated by the signal values in the touch area. Thus, when determining whether a contact is a hard press, the processing logic accounts for both the size (e.g., the quantitative "shape") of the touch area and the magnitudes of the signal values included in the touch area.

When the last local maximum is processed in block 930 and the index counter is incremented in block 940, the processing logic proceeds to block 915 and determines that all local maximums have been processed for hard press rejection. Thus, the processing logic proceeds from block 915 to block 950.

In block 950, the processing logic uses information about the detected contacts to calculate the contact positions of the contacts on the sensor array. For example, in some embodiments the processing logic may use the touch coordinates (and/or raw measurements and other information) obtained by a scan operation to compute the location centroids of all contacts that have been accepted as proper (e.g., such as contacts that have been accepted by the operations in block 938). The contacts that have been rejected as hard presses (e.g., by the operations in block 936) are not processed in block 950 or in the operations of any block thereafter.

In block 960, the processing logic correlates the contacts determined by the current scan operation with any previously detected contacts. For example, the processing logic can use the computed location centroids of the contacts to determine whether any contact detected in the current scan operation is the same contact that was determined in a previous scan operation and, if so, the processing logic assigns to such contact the same contact ID that was assigned to the previously-determined contact; otherwise, the processing logic assigns new contact IDs to all contacts that are newly detected in the current scan operation. Further, in some embodiments the processing logic may perform some additional operations related to (or based on) correlation of contacts such as, for example, debouncing and tracking of contact movements.

In block 990, the processing logic completes the contact processing and reports the contacts (and/or their related data) to the host or application for which the scan operation was performed. Since all hard press contacts have already been detected and rejected in block 936, in block 990 the processing logic does not report any hard presses (or their related data) for further processing.

It is noted that in the embodiment illustrated in FIG. 9, the techniques for hard press rejection (e.g., such as the operations in block 930) are performed for substantially all of the contacts that are detected during a given scan operation (e.g., such as the contacts that correspond to one or more local maximums). This results in simpler implementation in the firmware of a computing device and in less execution time since the hard press rejection operations are performed as part of a touch area search that must be run before any contact identification processing anyway.

In some embodiments, however, the processing logic may be configured to determine which contacts are new and which contacts have been detected in a previous scan operation prior to determining whether any of the contacts are hard presses. This allows the processing logic to perform the techniques for hard press rejection (e.g., such as the operations in block 930) only for the newly-detected contacts. For example, if the processing logic determines that the contact identifier associated with a particular contact is not in the list of previous contact identifiers, the processing logic can determine that the particular contact is a new contact for which the hard press rejection operations need to be performed. In this manner, the hard press rejection operations are bypassed for contacts that have been previously determined as proper (e.g., as non-hard press).

Figure 10:
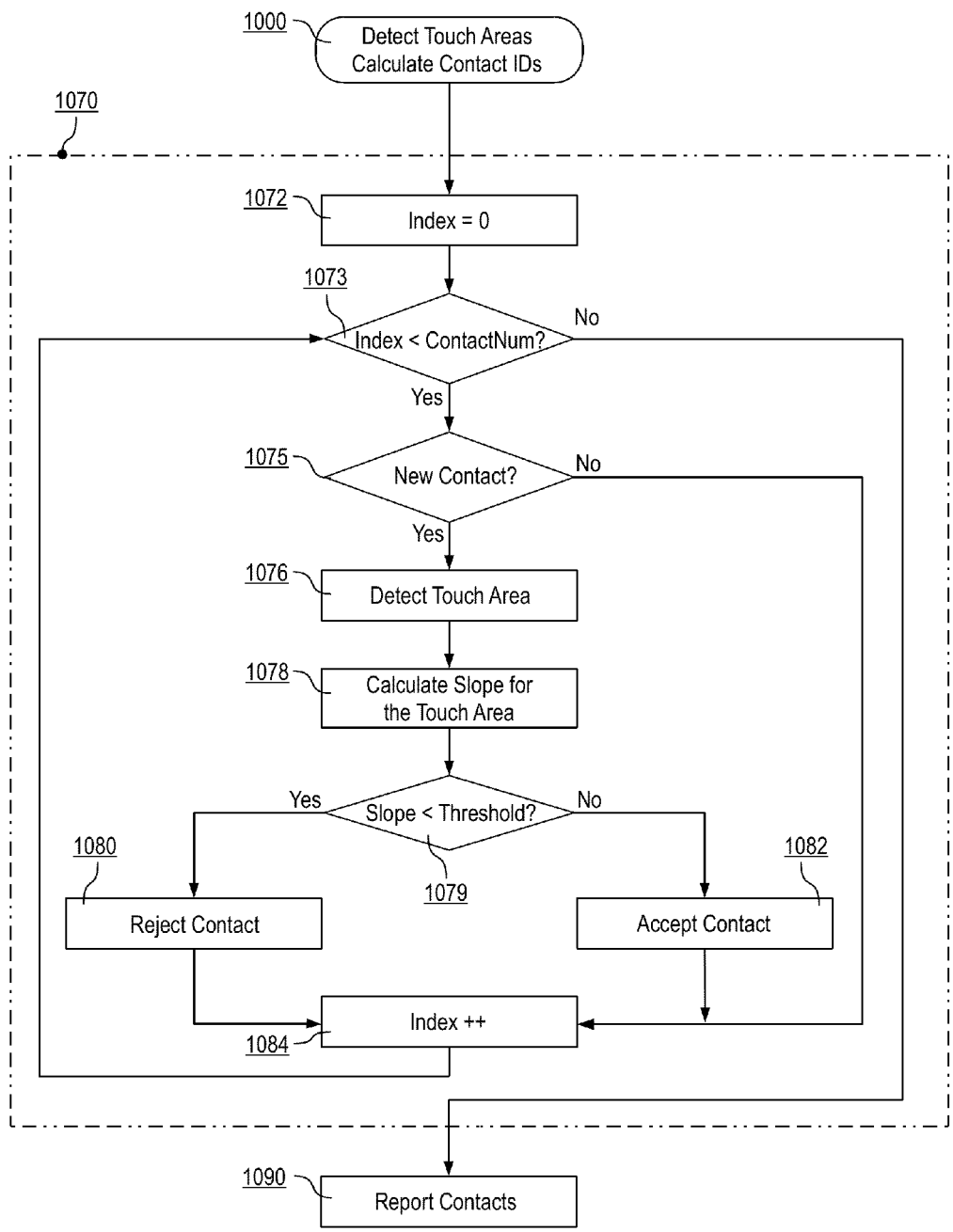
FIG. 10 illustrates an example method of hard press rejection after contact IDs determination according to example embodiments.

FIG. 10 illustrates an example method of hard press rejection after touch areas and contact IDs have been determined. The operations in the blocks of FIG. 10 are described hereinafter as being performed by a processing logic that is executed by a computing device. It is noted, however, that various implementations and embodiments may use different, and possibly multiple, components to perform the method of FIG. 10. Thus, the description hereinafter, of the method in FIG. 10 as being performed by a processing logic, is to be regarded in an illustrative rather than a restrictive sense.

In the method of FIG. 10, the processing logic performs the slope value computations when the contact IDs have already been determined. In this manner, the computationally-intensive slope value calculations are performed only for newly-detected contacts. While this contact filtering mechanism requires that the touch areas for new contacts are determined again (or twice) thereby incurring some extra processing time, the mechanism allows rejection of hard press contacts when real contacts (e.g., such as real fingers) have already been detected on the touch-sensing surface of the sensor array in a previous scan operation.

In block 1000, the processing logic determines the touch areas of one or more contacts that have already been detected on the sensor array, and assigns the appropriate contact IDs to the corresponding contacts after performing contact correlation. For example, to determine the touch areas for any detected local maximums, the processing logic searches the data structure that stores the signal values derived from measurements obtained by the current scan operation. For each local maximum that is found in the data structure, the processing logic checks and identifies any surrounding signal values that are bigger than a value that is the multiplication product of the local maximum and a coefficient (e.g. such as "0.5"). The signal values identified in this manner around a local maximum form the touch area of a contact that is associated with that local maximum. Next, the processing logic may perform some additional local maximum processing (e.g., such as parts area search) in order to find whether two or more local maximums need to be merged into a single contact and, if so, the processing logic combines the touch areas of the two or more local maximums into a single touch area. After determining the touch areas for the detected local maximums, the processing logic uses the touch coordinates (and/or raw measurements and other information) obtained by the scan operation to compute the location centroids of the contacts that correspond to the touch areas. Then, the processing logic correlates the detected contacts with any previously-detected contacts based on the computed location centroids. If any contact detected in the current scan operation is the same contact that was determined in a previous scan operation, the processing logic assigns to such contact the same contact ID that was assigned to the previously-determined contact; otherwise, the processing logic assigns new contact IDs to all contacts that are newly detected in the current scan operation. Finally, the processing logic determines the number of contact IDs (e.g., the number of contacts detected in the current scan operation), and sets to that number a programming variable (e.g., such as the "ContactNum" variable illustrated in FIG. 10). For example, if the processing logic does not detect any contacts in the current scan operation, then the "ContactNum" variable would be set to "0"; otherwise, the "ContactNum" variable would be set to the number of the detected contacts.

After detecting the touch areas and calculating the contact IDs for the detected contacts, in block 1070 (and the operations therein) the processing logic performs the techniques for hard press rejection for any new contacts that have not been detected in a previous scan operation.

In block 1072, the processing logic initializes to "0" a programming variable (e.g., such as the "Index" counter in FIG. 10) that is used for looping through each of the detected contacts in turn.

In block 1073, the processing logic compares the contacts index counter to the "ContactNum" variable. If the index counter is not less than the "ContactNum" variable, then all detected contacts have been processed for hard press rejection and the processing logic continues to block 1090. If the index counter is less than the "ContactNum" variable, then there are some outstanding contacts that still need to be processed, and the processing logic continues to block 1075 by selecting and processing the next/current contact with its corresponding contact ID.

In block 1075, the processing logic compares the contact ID of the current contact to the list (or set) of contact IDs that have been determined (and/or used) in the previous scan operation. If the contact ID is not new (e.g., is in the list or set of previous contact IDs), then the corresponding contact is an old contact and the processing logic continues to block 1084 to increment the index counter and to process the next outstanding contact. If the contact ID is new (e.g., is not in the list or set of previous contact IDs), then the corresponding contact is a new contact and the processing logic continues accordingly to block 1076.

In block 1076, the processing logic determines the touch area for the contact that is currently being processed. For example, the processing logic uses the touch-area determination techniques described heretofore to identify the signal values around the local maximum of the current contact, thereby determining the touch area of the current contact. In some embodiments, the processing logic may also perform a parts area search in order to find whether two or more contacts need to be merged into a single contact and, if so, to combine the touch areas of the two or more contacts into a single touch area.

After detecting the touch area for the current contact, in block 1078 the processing logic computes the slope value for the touch area of the current contact. For example, in some embodiments the processing logic uses equation (3) above, and computes the mean signal value of the touch area and a metric indicating a size of the touch area (e.g., such as a length, width, etc., or some other size property). The processing logic then computes the ratio of the mean signal value to the size metric, normalizes the computed ratio by multiplying it to the value of the local maximum corresponding to the current contact, and scales the result to obtain the slope value for the touch area.

In block 1079 the processing logic compares the computed slope value to a hard press threshold. If in block 1079 the processing logic determines that the slope value is less than the threshold, this means that the touch area represents a hard press that needs to be rejected; accordingly, the processing logic proceeds to block 1080 and rejects the contact by a suitable mechanism (e.g., such as setting a flag associated with the contact, storing/changing a property associated with the contact, etc.) If in block 1079 the processing logic determines that the slope value is greater than or equal to the threshold, this means that the touch area represents a contact by a normal object that needs to be accepted; accordingly, the processing logic proceeds to block 1082 and accepts the contact by a suitable mechanism. After completing the operations in each of blocks 1080 and 1082, the processing logic proceeds to block 1084 and increments the index counter which indicates the contact that is currently being processed. Then, from block 1084 the processing logic proceeds back to block 1073 in order to process the next contact indicated by the index counter.

When the last contact is processed in blocks 1075 to 1082 and the index counter is incremented in block 1084, the processing logic proceeds to block 1073 and determines that all detected contacts have been processed for hard press rejection. Thus, the processing logic proceeds from block 1073 to block 1090.

In block 1090, the processing logic completes the contact processing and reports the contacts (and/or their related data) to the host or application for which the scan operation was performed. Since all hard press contacts have already been detected and rejected in block 1080, in block 1090 the processing logic does not report any hard presses (or their related data) for further processing.

In some operational contexts and use cases, the slope values computed for the touch areas of very small objects (e.g., 3 mm and less) used as stylus can be similar to the slope values of a hard press. For example, when a user uses a sharp stylus that covers only one sensor element of a sensor array, the corresponding data structure may not have enough signal values to correctly compute the slope value and to correctly accept or reject the contact. Further, very small objects typically generate signals of very small magnitudes and the size of the touch area of such small objects is much smaller than the size of the touch areas of normal fingers.

To address this issue, in some embodiments in addition to using a slope value, the techniques described herein provide for checking the size of the touch area of a contact and rejecting the contact if the size is above a certain touch-area threshold. For example, the techniques described herein may use as a touch-area threshold some small number, where the contacts with touch areas having slope values less than the hard press threshold and sizes greater than the touch-area threshold are rejected as hard presses. In this manner, the techniques described herein ensure that the slope values, which are used to reject hard presses, are computed based on sufficient information.

Figure 11:
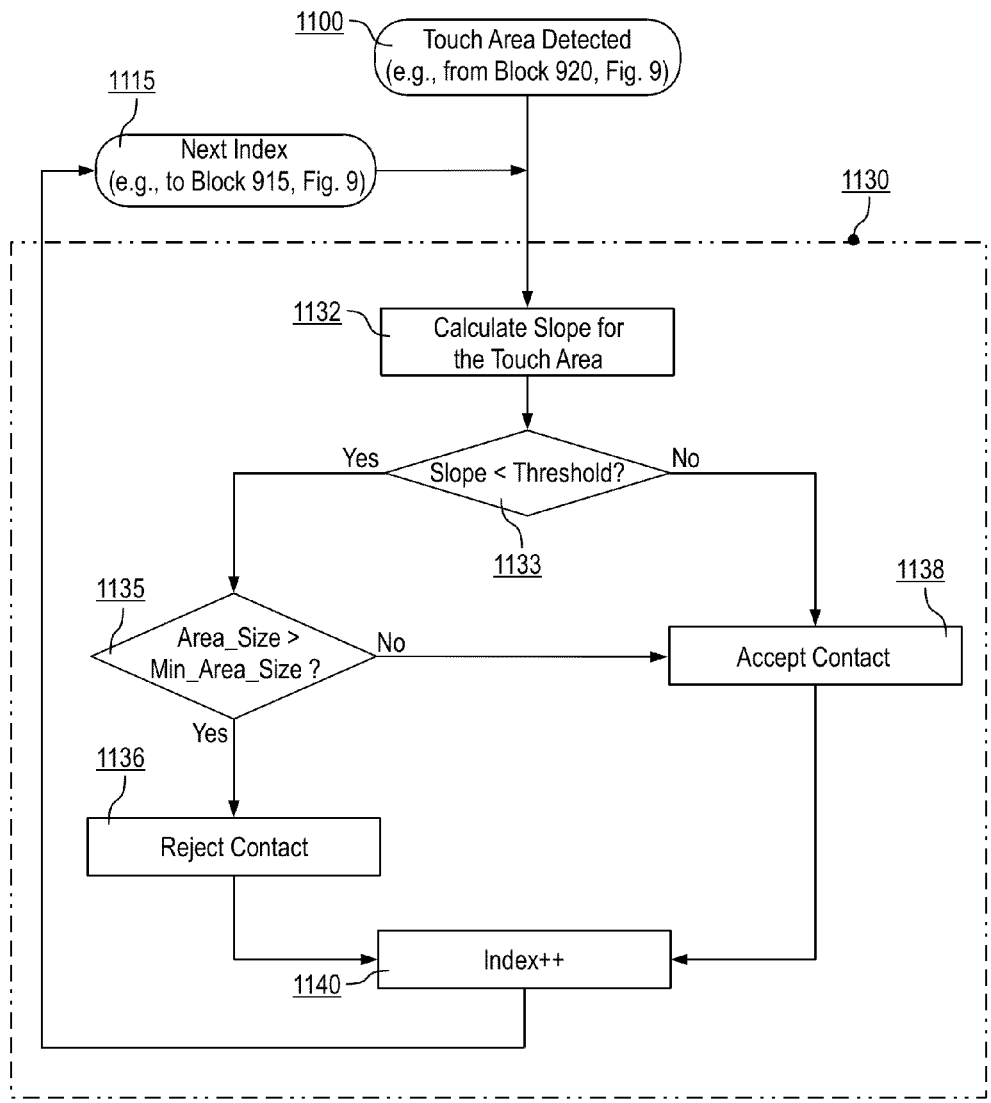
FIG. 11 illustrates an example method of hard press rejection with additional touch area size conditions according to example embodiments.

FIG. 11 illustrates an example method of hard press rejection with additional touch area size conditions. The operations in the blocks of FIG. 11 are described hereinafter as being performed by a processing logic that is executed by a computing device. It is noted, however, that various implementations and embodiments may use different, and possibly multiple, components to perform the method of FIG. 11. Thus, the description hereinafter, of the method in FIG. 11 as being performed by a processing logic, is to be regarded in an illustrative rather than a restrictive sense.

The method of FIG. 11 is a modified version of the method illustrated in FIG. 9. Specifically, the method of FIG. 11 introduces an additional check for the touch area size between blocks 933 and 936.

At block 1100, the processing logic has performed all of the operations that were described for blocks 900, 905, 910, 915, and 920 of FIG. 9. Specifically, at block 1100 in FIG. 11, the processing logic has: detected the local maximums in the signal values derived from the measurements obtained by the current scan operation; initialized all variables (e.g., such as the "LocalMaxNum" variable indicating the number of the local maximums and the index counter for looping through each local maximum); selected a current local maximum for processing; and determined the touch area for the current local maximum.

After determining the touch area for the current local maximum, in block 1130 (and the operations therein) the processing logic performs the techniques for hard press rejection with an additional check for touch area size. Specifically, in block 1132 the processing logic computes the slope value for the touch area of the current local maximum. For example, in some embodiments the processing logic uses equation (3) above, and computes the mean signal value of the touch area and a metric indicating a size of the touch area (e.g., such as a length, width, etc., or some other size property). The processing logic then computes the ratio of the mean signal value to the size metric, normalizes the computed ratio by multiplying it to the value of the current local maximum, and scales the result to obtain the slope value for the touch area.

In block 1133 the processing logic compares the computed slope value to a hard press threshold. If in block 1133 the processing logic determines that the slope value is greater than or equal to the threshold, this means that the touch area represents a contact by a normal object that needs to be accepted; accordingly, the processing logic proceeds to block 1138 and accepts the contact by a suitable mechanism (e.g., such as setting a flag associated with the contact, storing/changing a property associated with the contact, etc.)

If in block 1133 the processing logic determines that the slope value is less than the threshold, the processing logic proceeds to block 1135 to perform an additional check on the size of the touch area. In block 1135, the processing logic compares the size of the touch area to a pre-defined touch-area threshold. The touch-area threshold may be set in a programming variable (e.g., such as the "Min_Area_Size" variable in FIG. 11). Further, the touch-area threshold may be a small number in magnitude (e.g., such "3" or "4"), thereby indicating that there need to be at least a minimum number of signal values in the touch area before the slope value thereof can be validly used to reject a hard press. If in block 1135 the processing logic determines that size of the touch area is greater than the touch-area threshold, this means that the touch area represents a hard press that needs to be rejected; accordingly, the processing logic proceeds to block 1136 and rejects the contact by a suitable mechanism.

After completing the operations in each of blocks 1136 and 1138, the processing logic proceeds to block 1140 and increments the index counter which indicates the local maximum that is currently being processed. Then, from block 1140 the processing logic proceeds to block 1115 (e.g., such as the operations in block 915 in FIG. 9) in order to process the next local maximum indicated by the index counter. When the last local maximum is processed in block 1130, the processing logic proceeds to block 1115 and determines that all local maximums have been processed for hard press rejection. From thereon, the processing logic continues with the operations described for blocks 950, 960, and 990 in FIG. 9.

Other Features and Embodiments

In some embodiments, the techniques for hard press rejection described herein may use equation (1) above in order to compute the slope value for the touch area of a detected object. Using equation (1) simplifies the computations and expends less computing resources, but in some operational contexts may cause contacts from fat fingers and large objects (e.g., such as a palm) to be accidentally rejected.

In some embodiments, the techniques for hard press rejection described herein can be used for sensor arrays having self-capacitance sensor elements as well as sensor arrays that use optical sensing. These embodiments take advantage of the fact that multiple sensor elements are activated in response to a contact by an object, so the techniques described herein are able to analyze a signal pattern from multiple neighboring sensor elements and to separate noise from actual signal. Thus, the techniques described herein are not limited to capacitive sensing, but rather can be used with other types of sensing that rely on arrays of sensors.

In some embodiments, the techniques for hard press rejection described herein may be applied to other technologies where object detection is based on a signal matrix and can depend on the shape or profile of the detected objects. For example, a filter in accordance with the techniques described herein may be combined with other filters to give better performance depending on a specific use case. Further, the data used by such filter need not be stored in a matrix-type data structure. Rather, the techniques described herein may be implemented on data that is stored in a one-dimensional array of values, where the metric indicating the "touch area shape" would simply be a distance/length in a particular direction (e.g., such as either an X value or a Y values obtained from a self-capacitance slider array).

In an example embodiment, a device comprises a sensor coupled with a processing logic. The sensor is configured to measure a plurality of measurements from a sensor array during a scan operation, where the plurality of measurements represents an object that is detected on the sensor array. The processing logic is configured at least to: determine a touch area corresponding to the detected object on the sensor array, where the touch area is associated with multiple signal values that are derived from the plurality of measurements; compute a slope value for the detected object based on a ratio of a signal distribution value in the touch area to a metric indicating a size of the touch area with respect to the sensor array; and reject the detected object based on a comparison of the slope value to a threshold. In one aspect, the sensor array is one of a mutual capacitance sensor array and a self-capacitance sensor array.

In one aspect of this embodiment, the detected object is rejected without computing or using a signal value representing pressure that is caused by the detected object on a touch-sensing surface of the sensor array. In another aspect, the plurality of measurements represents a contact by the detected object with the sensor array, where the contact is not preceded by another contact which corresponds to the detected object and which was detected in a previous scan operation.

In one aspect of this embodiment, the multiple signal values are stored into a data structure according to an organization that associates the positions of the multiple signal values in the data structure with the locations of respectively corresponding multiple sensor elements in the sensor array, where the metric represents a difference between indexes of at least two signal values that border the touch area.

In one aspect of this embodiment, the metric indicating the size of the touch area is expressed as one of: a number of sensor elements, of the sensor array, that correspond to the multiple signal values in the touch area; or a difference between indexes of at least two signal values that border the multiple signal values in the touch area. In another aspect, the metric comprises one of: a length of the touch area as expressed in a first number of sensor elements, of the sensor array, that are affected by the detected object; a width of the touch area as expressed in a second number of sensor elements, of the sensor array, that are affected by the detected object; or the larger one of the length and the width of the touch area, where the length and the width of the touch area are both expressed in number of sensor elements, of the sensor array, that are affected by the detected object.

In one aspect of this embodiment, the detected object is one of: a non-conductive object; a finger in a leather glove; and a plastic cover being pressed into the sensor array.

In one aspect of this embodiment, the processing logic is further configured to decide, prior to rejecting the detected object, whether to accept or to reject the detected object based on the comparison of the slope value to the threshold. In another aspect, the processing logic is further configured to derive the multiple signal values from the plurality of measurements.

In one aspect of this embodiment, in order to determine the touch area the processing logic is configured to determine a perimeter of sensor elements, of the sensor array, that surround those sensor elements that are affected by the detected object. In another aspect, the perimeter is defined based on index values of receiving (RX) electrodes and transmitting (TX) electrodes of the sensor array.

In one aspect of this embodiment, the processing logic is configured to compute the signal distribution value in the touch area based on the multiple signal values that correspond to multiple sensor elements, of the sensor array, that are affected by the detected object. In another aspect, the processing logic is further configured to compute the slope value by multiplying the ratio to the highest value in the multiple signal values. In yet another aspect, the processing logic is further configured to scale the slope value to a one-byte value. In yet another aspect, the processing logic is further configured to: assign unique identifiers to one or more objects that are detected based on measurements that are measured from the sensor array during at least one previous scan operation; and determine, based at least in part on the unique identifiers, that the detected object is a new object that is different from the one or more objects. In yet another aspect, to reject the detected object the processing logic is further configured to compare the size of the touch area to a minimum touch-area threshold.

In another example embodiment, a system comprises a capacitive sensor array, a capacitive sensor, and processing logic. The capacitive sensor array comprises a plurality of sensor elements and is coupled to the capacitive sensor. The capacitive sensor is coupled to the processing logic and is configured to measure a plurality of measurements from the plurality of sensor elements during a scan operation, where the plurality of measurements represents an object that is detected on the capacitive sensor array. The processing logic is configured at least to: determine a touch area corresponding to the detected object on the capacitive sensor array, where the touch area is associated with multiple signal values that are derived from the plurality of measurements; compute a slope value for the detected object based on a ratio of a signal distribution value in the touch area to a metric indicating a size of the touch area with respect to the capacitive sensor array; and reject the detected object based on a comparison of the slope value to a threshold. In one aspect, the capacitive sensor array is a mutual capacitance sensor array or a self-capacitance sensor array.

In one aspect of this embodiment, the detected object is one of a non-conductive object, a finger in a leather glove, and a plastic cover being pressed into the capacitive sensor array. In another aspect, the detected object is rejected without computing or using a signal value representing pressure that is caused by the detected object on a touch-sensing surface of the capacitive sensor array. In another aspect, the plurality of measurements represents a contact by the detected object with the capacitive sensor array, where the contact is not preceded by another contact which corresponds to the detected object and which was detected in a previous scan operation.

Various embodiments of the techniques for hard press rejection described herein may include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium, e.g., such as a firmware that includes volatile storage and/or non-volatile storage. These instructions may be used to program a device (e.g., such as a computing device) that includes one or more general-purpose or special-purpose processors (e.g., such as Central Processing Units, or CPUs) or equivalents thereof (e.g., such as processing cores, processing engines, microcontrollers, and the like), so that when executed by the processor(s) or the equivalents thereof, the instructions cause the device to perform the operations for hard press rejection described herein. A non-transitory computer-readable medium may also include one or more mechanisms for storing or transmitting information in a form (e.g., software, processing application, etc.) that is readable by a machine (e.g., such as a device or a computer). The non-transitory computer-readable storage medium may include, but is not limited to, electromagnetic storage medium (e.g., floppy disks, hard disks, and the like), optical storage medium (e.g., CD-ROM), magneto-optical storage medium, read-only memory (ROM), random-access memory (RAM), erasable programmable memory (e.g., EPROM and EEPROM), flash memory, or another now-known or later-developed type of medium that is suitable for storing information. Additionally, in some embodiments the information transferred to and between one or more computing devices may either be pulled or pushed across a transmission medium accessible to the device(s).

Although the operations of the method(s) herein are shown and described in a particular order, the order of the operations of each method may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method for hard press rejection, the method comprising:
   accessing a set of signal values representing an object that is detected on a sensor array during a scan operation;
   determining a touch area corresponding to the detected object on the sensor array, wherein the touch area is associated with multiple signal values from the set of signal values;
   computing a slope value for the detected object based on a ratio of a signal distribution value in the touch area to a metric indicating a size of the touch area with respect to the sensor array; and
   rejecting the detected object based at least on a comparison of the slope value to a threshold.

2. The method of claim 1, wherein the multiple signal values represent a contact by the detected object with the sensor array, wherein the contact is not preceded by another contact which corresponds to the detected object and which was detected in a previous scan operation.

3. The method of claim 1, further comprising storing the set of signal values into a data structure according to an organization that associates the positions of the set of signal values in the data structure with the locations of a respectively corresponding set of sensor elements in the sensor array.

4. The method of claim 3, wherein the metric indicating the size of the touch area comprises one of:
   a length of the touch area as expressed in a first difference between first indexes of at least two signal values that border the touch area;
   a width of the touch area as expressed in a second difference between second indexes of at least two signal values that border the touch area;
   the larger one of the length and the width of the touch area, wherein the length and the width of the touch area are both expressed as differences between at least two indexes of at least two signal values that border the touch area.

5. The method of claim 1, further comprising:
   receiving a plurality of measurements that are measured from the sensor array during the scan operation; and
   deriving the set of signal values from the plurality of measurements.

6. The method of claim 1, further comprising computing the signal distribution value in the touch area, wherein computing the signal distribution value comprises:
   computing a sum of the multiple signal values; and
   dividing the sum of the multiple signal values by the number of the multiple signal values.

7. The method of claim 1, wherein computing the slope value comprises one or more of:
   computing the slope value by multiplying the ratio to the highest value in the multiple signal values; and
   scaling the slope value to a one-byte value.

8. The method of claim 1, further comprising:
   assigning unique identifiers to one or more objects that are detected on the sensor array during at least one previous scan operation; and
   determining, based at least in part on the unique identifiers, that the detected object is a new object that is different from the one or more objects.

9. The method of claim 1, wherein rejecting the detected object further comprises:
   determining whether to accept or to reject the detected object by performing the comparison of the slope value to the threshold;
   comparing the size of the touch area to a minimum touch-area threshold; and
   rejecting the detected object when the slope value is less than the threshold and the size of the touch area is greater than the minimum touch-area threshold.

10. The method of claim 1, wherein:
    the detected object is one of a non-conductive object, a finger in a leather glove, and a plastic cover being pressed into the sensor array; and
    the sensor array is one of a mutual capacitance sensor array and a self-capacitance sensor array.

11. A non-transitory firmware storing a set of instructions that comprise firmware instructions which, when executed by a computing device, cause the computing device to perform operations comprising:
    accessing a set of signal values representing an object that is detected on a sensor array during a scan operation;
    determining a touch area corresponding to the detected object on the sensor array, wherein the touch area is associated with multiple signal values from the set of signal values;

computing a slope value for the detected object based on a ratio of a signal distribution value in the touch area to a metric indicating a size of the touch area with respect to the sensor array; and rejecting the detected object based at least on a comparison of the slope value to a threshold.

12. The non-transitory firmware of claim 11, wherein the multiple signal values represent a contact by the detected object with the sensor array, wherein the contact is not preceded by another contact which corresponds to the detected object and which was detected in a previous scan operation.

13. The non-transitory firmware of claim 11, wherein the firmware instructions further comprise instructions which, when executed by the computing device, cause storing the set of signal values into a data structure according to an organization that associates the positions of the set of signal values in the data structure with the locations of a respectively corresponding set of sensor elements in the sensor array.

14. The non-transitory firmware of claim 13, wherein the metric indicating the size of the touch area comprises one of:
a length of the touch area as expressed in a first difference between first indexes of at least two signal values that border the touch area;
a width of the touch area as expressed in a second difference between second indexes of at least two signal values that border the touch area;
the larger one of the length and the width of the touch area, wherein the length and the width of the touch area are both expressed as differences between at least two indexes of at least two signal values that border the touch area.

15. The non-transitory firmware of claim 11, wherein the firmware instructions further comprise instructions which, when executed by the computing device, cause:
receiving a plurality of measurements that are measured from the sensor array during the scan operation; and
deriving the set of signal values from the plurality of measurements.

16. The non-transitory firmware of claim 11, wherein the firmware instructions further comprise instructions which, when executed by the computing device, cause computing the signal distribution value in the touch area, wherein computing the signal distribution value comprises:
computing a sum of the multiple signal values; and
dividing the sum of the multiple signal values by the number of the multiple signal values.

17. The non-transitory firmware of claim 11, wherein the firmware instructions that cause computing the slope value comprise instructions which, when executed by the computing device, cause the computing device to perform one or more of:
computing the slope value by multiplying the ratio to the highest value in the multiple signal values; and
scaling the slope value to a one-byte value.

18. The non-transitory firmware of claim 11, wherein the firmware instructions further comprise instructions which, when executed by the computing device, cause:
assigning unique identifiers to one or more objects that are detected on the sensor array during at least one previous scan operation; and
determining, based at least in part on the unique identifiers, that the detected object is a new object that is different from the one or more objects.

19. The non-transitory firmware of claim 11, wherein the firmware instructions that cause rejecting the detected object further comprise instructions which, when executed by the computing device, cause:
determining whether to accept or to reject the detected object by performing the comparison of the slope value to the threshold;
comparing the size of the touch area to a minimum touch-area threshold; and
rejecting the detected object when the slope value is less than the threshold and the size of the touch area is greater than the minimum touch-area threshold.

20. The non-transitory firmware of claim 11, wherein:
the detected object is one of a non-conductive object, a finger in a leather glove, and a plastic cover being pressed into the sensor array; and
the sensor array is one of a mutual capacitance sensor array and a self-capacitance sensor array.

* * * * *